(12) United States Patent
Kalinowski et al.

(10) Patent No.: US 12,448,017 B2
(45) Date of Patent: *Oct. 21, 2025

(54) DELIVERY SYSTEMS FOR RAMPS OR STAIRS

(71) Applicant: Rehrig Pacific Company, Los Angeles, CA (US)

(72) Inventors: Dane Gin Mun Kalinowski, Foothill Ranch, CA (US); Joseph E. Popovits, II, Costa Mesa, CA (US); Travis James Englert, Brea, CA (US)

(73) Assignee: Rehrig Pacific Company, Monterey Park, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/529,807

(22) Filed: Dec. 5, 2023

(65) Prior Publication Data

US 2024/0101176 A1    Mar. 28, 2024

Related U.S. Application Data

(63) Continuation of application No. 17/985,848, filed on Nov. 12, 2022, now Pat. No. 11,873,020.

(60) Provisional application No. 63/416,679, filed on Oct. 17, 2022, provisional application No. 63/412,770, filed on Oct. 3, 2022, provisional application No. 63/327,550, filed on Apr. 5, 2022, provisional application No. 63/279,057, filed on Nov. 12, 2021.

(51) Int. Cl.
*B62B 3/02* (2006.01)
*B62B 3/00* (2006.01)
*B62B 5/00* (2006.01)
*B62B 5/06* (2006.01)

(52) U.S. Cl.
CPC ............... *B62B 3/02* (2013.01); *B62B 3/001* (2013.01); *B62B 5/00* (2013.01); *B62B 5/0033* (2013.01); *B62B 5/0069* (2013.01); *B62B 5/063* (2013.01); *B62B 2301/10* (2013.01)

(58) Field of Classification Search
CPC .. B62B 3/02; B62B 3/001; B62B 5/00; B62B 5/0033; B62B 5/0069; B62B 5/063; B62B 2301/10; B62B 2203/07; B62B 2301/256; B62B 5/02; B62B 3/0612; B66F 9/075; B66F 9/0755; B66F 9/07559; B66F 9/20; B66F 17/003
See application file for complete search history.

(56) References Cited

U.S. PATENT DOCUMENTS 11,873,020 B2 *   1/2024   Kalinowski ............. B62B 5/063

* cited by examiner

*Primary Examiner* — Lynn E Schwenning
(74) *Attorney, Agent, or Firm* — Carlson, Gaskey & Olds, P.C.

(57) ABSTRACT

A pallet lift includes a base and a deck extending forward of the base. Load wheels support the deck. A platform above the deck is pivotable relative to the base. The platform has an upper support surface for supporting objects thereon. The platform may be pivoted as the pallet lift travels on an inclined surface, such as a truck ramp, in order to keep the platform relatively level relative to gravity to increase stability.

30 Claims, 27 Drawing Sheets

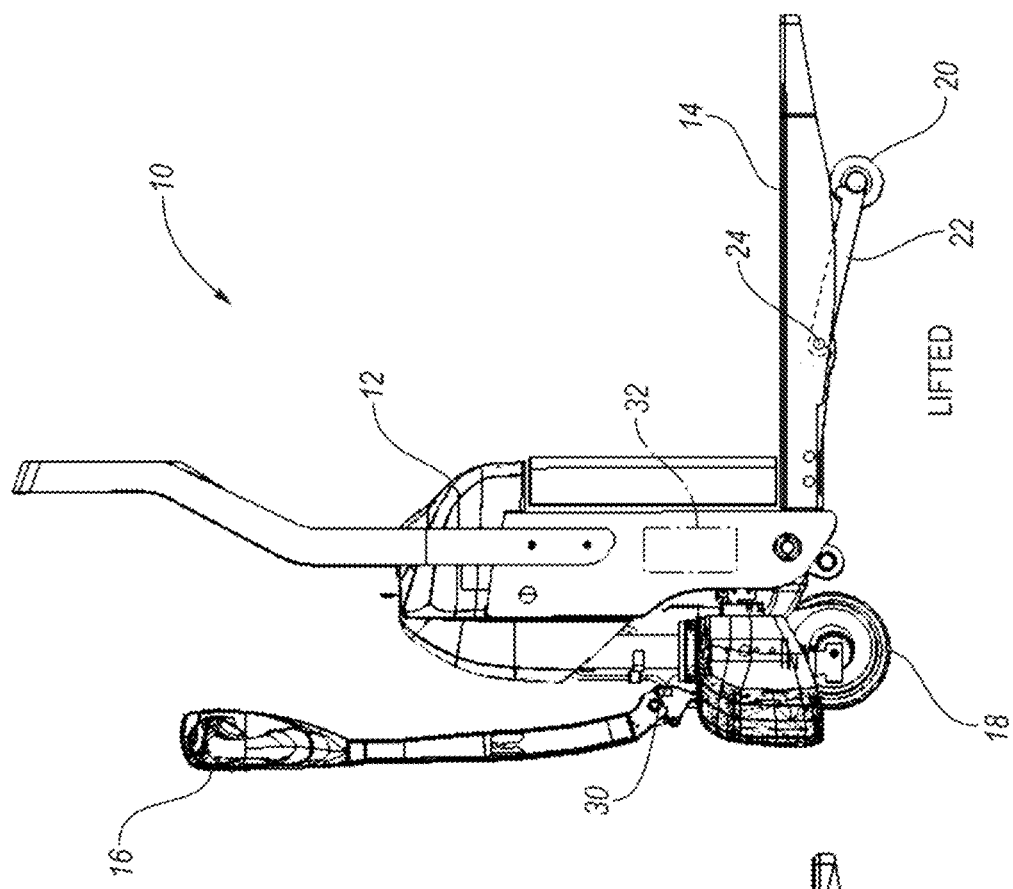
FIG. 2 LIFTED
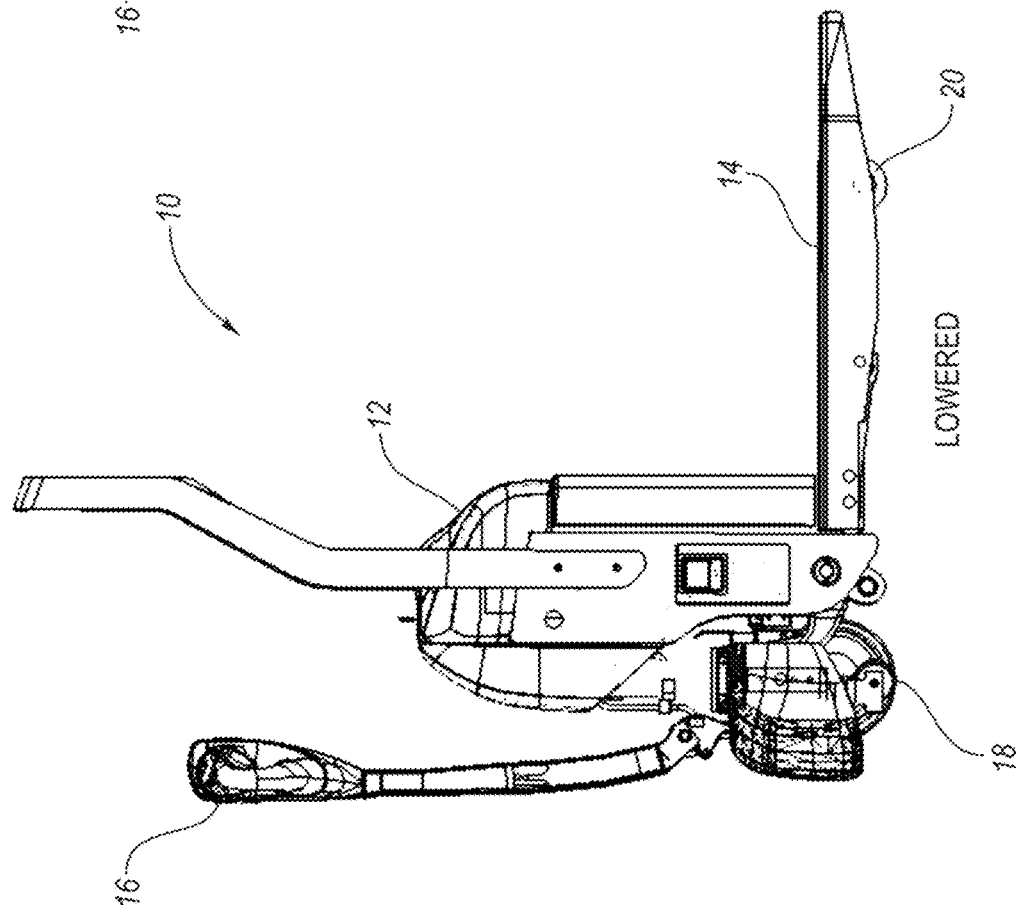
FIG. 1 LOWERED

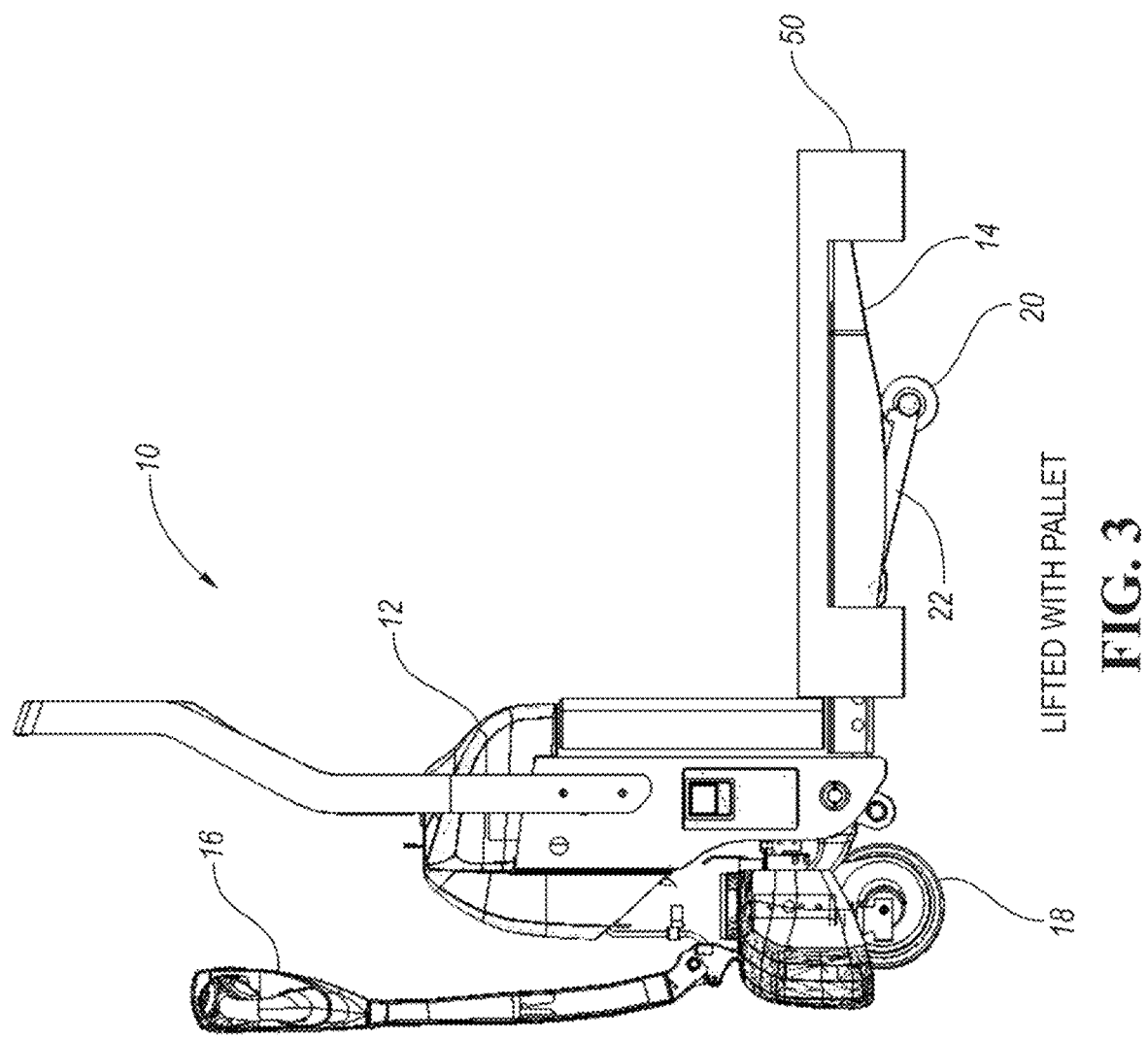

TILT FOR DECLINE

TILT FOR INCLINE

TILT FOR DECLINE WITH PALLET

TILT FOR INCLINE WITH PRODUCT

TILT FOR DECLINE

SIDE OF 2 AXIS TILT

ISO OF 2 AXIS TILT

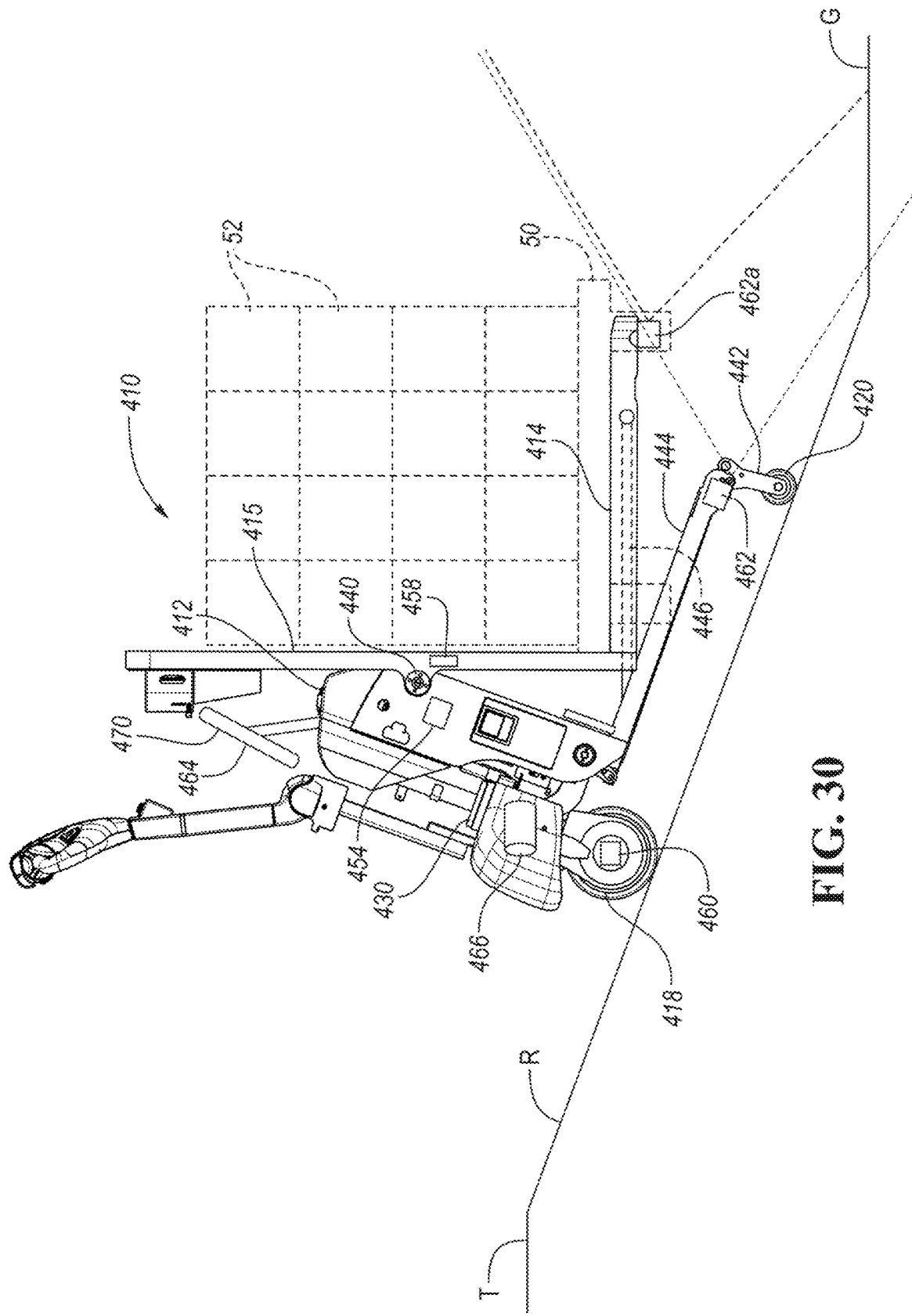

DELIVERY SYSTEMS FOR RAMPS OR STAIRS

BACKGROUND

In the delivery industry box trucks are becoming a common choice to make many types of deliveries. They offer value over tractor trailers for many delivery routes because drivers do not need a commercial driver license to operate them (large labor pool, non-specialized), and typically box trucks are cheaper to operate and are more maneuverable than tractor trailers.

A major challenge with box truck deliveries is transporting product from the elevated truck bed to ground level. To overcome this, box trucks are equipped with either a hydraulic liftgate, or a long (10-14') ramp which is stowed underneath the truck while in route.

At times, the product must also be transported up or down stairs, which is not possible with a traditional pallet jack and which is difficult with a dolly.

SUMMARY

The delivery system improves safety and delivery efficiency over current state, where ramps are used, to reduce operator injury and spills by keeping the load level while moving up and down the ramp. Another embodiment of the delivery system makes it easier to bring a load up or down stairs.

In some aspects, the techniques described herein relate to a pallet lift including: a base; a deck extending forward of the base; load wheels supporting the deck; and a platform above the deck and pivotable relative to the base, wherein the platform has an upper support surface for supporting objects thereon.

In some aspects, the techniques described herein relate to a pallet lift further including a backrest extending upward from the platform, wherein the backrest is pivotably secured to the base.

In some aspects, the techniques described herein relate to a pallet lift further including an actuator configured to pivot the platform relative to the base.

In some aspects, the techniques described herein relate to a pallet lift wherein the platform is pivotable about an axis parallel to axes of the load wheels.

In some aspects, the techniques described herein relate to a pallet lift further including a rear wheel mounted below the base and pivotable relative to the base by a tiller arm.

In some aspects, the techniques described herein relate to a pallet lift further including a gravity sensor configured to detect its orientation relative to gravity.

In some aspects, the techniques described herein relate to a pallet lift further including a controller configured to automatically cause the platform to pivot relative to the base based upon a gravity signal from the gravity sensor.

In some aspects, the techniques described herein relate to a pallet lift further including a speed sensor configured to detect a speed of the pallet lift and to generate a speed signal indicative of the speed of the pallet lift, wherein the pallet lift further includes at least one motor for powering at least one of the load wheels, wherein the controller is configured control a speed of the at least one motor based upon the speed signal from the speed sensor.

In some aspects, the techniques described herein relate to a pallet lift wherein the controller is configured to control the speed of the at least one motor based upon the gravity signal.

In some aspects, the techniques described herein relate to a pallet lift wherein the load wheels are secured to arms pivotably secured to the deck.

In some aspects, the techniques described herein relate to a pallet lift further including: at least one camera mounted to the deck; and a display mounted to the base, the display configured to display a live view from the at least one camera.

In some aspects, the techniques described herein relate to a method for moving a load including: a) moving a load on a platform onto an inclined ramp; b) pivoting the load and the platform relative to wheels supporting the platform on the inclined ramp; and c) moving the load on the platform across the inclined ramp while the load and the platform are pivoted relative to the wheels.

In some aspects, the techniques described herein relate to a method wherein the platform is substantially perpendicular to gravity during step c).

In some aspects, the techniques described herein relate to a method wherein the inclined ramp is inclined more than ten degrees.

In some aspects, the techniques described herein relate to a pallet lift including: a base; at least one rear wheel supporting the base; a platform extending forward from the base; and a load wheel secured to an arm pivotably secured to the platform, wherein the arm is configured to move the load wheel toward and away from the platform thereby pivoting the platform relative to a surface on which the at least one rear wheel and the load wheel are supported.

In some aspects, the techniques described herein relate to a pallet lift wherein the arm is able to move the load wheel toward and away from the platform without moving the at least one rear wheel relative to the base.

In some aspects, the techniques described herein relate to a stair climbing device including: a base; a motor mounted to the base; and a plurality of rods configured to be rotatably driven by the motor about an axis perpendicularly to the plurality of rods.

In some aspects, the techniques described herein relate to a stair climbing device in combination with a hand cart, wherein the stair climbing device is secured to the hand cart.

In some aspects, the techniques described herein relate to a method for stabilizing a load including: a) supporting a load on a platform; b) detecting a change in orientation of the platform; and c) pivoting the platform relative to a surface on which the platform is supported to counteract the change in orientation detected in step b).

In some aspects, the techniques described herein relate to a method wherein the change in orientation in step b) is caused by wheels supporting the platform being supported on an inclined surface.

In some aspects, the techniques described herein relate to a method wherein step c) further includes pivoting the platform relative to the wheels to maintain the platform substantially perpendicular to gravity.

In some aspects, the techniques described herein relate to a method wherein the platform is connected to a backrest and wherein the platform and backrest are pivoted in step c).

In some aspects, the techniques described herein relate to a method wherein the platform and backrest are pivoted away from the inclined surface in step c).

In some aspects, the techniques described herein relate to a pallet lift having: a base; at least one rear wheel supporting the base; a platform extending forward from the base; a camera mounted proximate a front of the pallet lift; a display oriented generally rearward of the pallet lift, the display configured to provide a live video feed from the camera; and a load wheel secured to an arm pivotably secured to the platform, wherein the arm is configured to move the load wheel toward and away from the platform.

BRIEF DESCRIPTION OF THE DRAWINGS

FIG. 1 shows a ramp delivery system according to a first embodiment, which is a pallet lift.

FIG. 2 shows the pallet lift of FIG. 1 with the platform raised relative to the load wheels and the rear wheel.

FIG. 3 shows the pallet lift of FIG. 2 supporting a pallet thereon.

FIG. 30 shows the pallet lift carrying a pallet on the platform down a ramp between a truck and ground.

DETAILED DESCRIPTION

Figure 4:
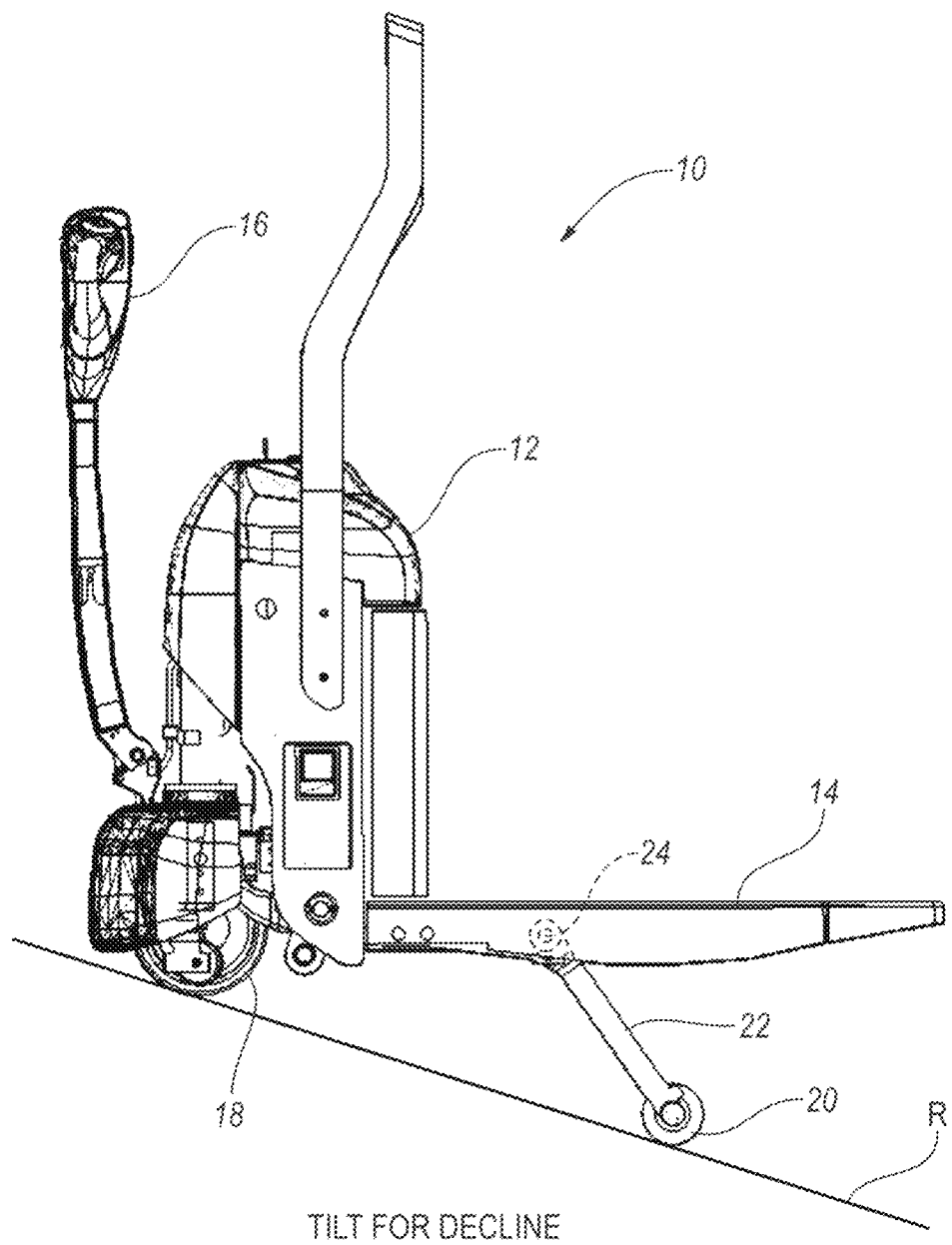
FIG. 4 shows the pallet lift of FIG. 1 moving down a ramp R.

FIG. 1 shows a ramp delivery system according to a first embodiment, which is a pallet lift 10. The pallet lift 10 includes a base 12 and a platform 14 extending forward from the base 12. A tiller arm 16 is pivotably connected to the base 12 and is used to steer and control the pallet lift 10. A rear wheel 18 is mounted below the base 12 and may be pivoted by the tiller arm 16. Load wheels 20 (preferably two, but only one is visible) support the platform 14. The platform 14 may comprise a single, continuous structure or a pair of spaced-apart tines.

The rear wheel 18 and/or the load wheels 20 may be motorized, such as by having hub motors therein to drive, brake and control the pallet lift 10. The pallet lift 10 may take the form of a pallet jack, with hydraulics or electric motors or actuators configured to lift the platform 14 relative to the floor, such as by pivoting the load wheels 20 away from the platform 14.

As shown in FIG. 2, the pallet lift 10 raises the platform relative to the load wheels 20 and the rear wheel 18. In this embodiment, the load wheels 20 are rotatably connected at the ends of arms 22 that are pivotably connected to the platform 14 about an axis 24. Rotation of the arms 22 by a front actuator 32, which may be a hydraulic cylinder or electric motor or linear actuator or other suitable device, causes the platform 14 to lift relative to the load wheels 20. This is similar to existing pallet jacks, but the arms 22 are substantially longer (e.g. more than 12", and in the range of 12" to 30"). Also, unlike existing pallet jacks, a separate rear actuator 30 (which again may be a hydraulic cylinder or electric motor or linear actuator or other suitable device) lifts the base 12 of the pallet lift 10 relative to the rear wheel 18. The base 12 can be raised and lowered relative to the rear wheel 18 and the platform 14 can be raised and lowered relative to the load wheels 20. Because they have their own actuators 30, 32, the front and rear of the pallet lift 10 can be raised and lowered independently of one another, or together (as in FIG. 2).

As shown in FIG. 3, and as is known, the platform 14 can be used to lift a pallet 50 off a floor for moving the pallet 50. In FIG. 3, the platform 14 is substantially parallel to the floor on which the pallet lift 10 is supported. It should be noted that a slight rearward tilt (e.g. approximately a degree or two) would be considered substantially parallel to the floor in this context.

Referring to FIG. 4, when the pallet lift 10 is moving down a ramp R, the front actuator 32 (FIG. 2) rotates the arms 22 to extend the load wheels 20 downward far enough to keep the platform 14 level relative to the earth. The base 12 is not raised relative to the rear wheel 18 (or at least, not as much). This keeps the platform 14 level, i.e. substantially perpendicular to gravity, and the load (not shown) stable on the platform 14. While traveling down the ramp R, the motors on the load wheels 20 and/or rear wheel 18 control the pace of the descent.

Thus, in this embodiment, the rear actuator 30 for raising the base 12 relative to the rear wheel 18 can be activated independently of the front actuator 32 for raising the platform 14 relative to the load wheels 20, and vice versa. The platform 14 is both raised above the floor (e.g. to lift a pallet off the floor) and maintained to be level relative to earth.

In one embodiment, sensors on the pallet lift 10 (e.g. a two-axis accelerometer, a three-axis accelerometer and/or gyroscope in the base 12 or on the platform 14) are configured to detect the direction of gravity. Based upon a determined direction of gravity, a controller (which may include a processor or hardwired control circuitry or control logic) is programmed to maintain the sensors, the base 12, and/or the platform 14 normal to the direction of gravity by adjusting the relative height between the platform 14 and the load wheels 20 and the relative height between the base 12 and the rear wheel 18. One method of automatically leveling the load while the pallet lift 10 navigates non-level surfaces could be detecting the difference between the normal vector of pallet lift 10 platform and the gravitational normal vector, then adjusting the platform 14 tilt angle in real time to keep both vectors parallel so that the load is level.

In one embodiment, the lift height and tilt angle could be controlled by the same actuator, such that the initial displacement results in vertical lift (or substantially vertical lift) and further displacement results in tilting (or much more substantial tilting) of the load platform. This could be accomplished by cams, gears, levers, etc.

In another embodiment the amount of lift and amount of tilt could be controlled separately and operated as two separate systems.

The lift and tilt could also be operated manually, hydraulically, electrically, pneumatically or a combination of all. The auto tilt could be turned on by a button, switch, or automatically turn on after sensing the system is on a grade.

The pallet lift 10 could use a platform 14 which can lift a pallet 50 or allow product to be set directly on the platform. The platform 14 could have features which interlock with a pallet 50 to prevent the pallet 50 from sliding off.

The platform 14 could also have features to prevent loose product from sliding off. Features could include rails, textured surfaces, locking belts or a combination.

In one embodiment the platform could contain a backrest to stabilize the load during use.

Figure 5:
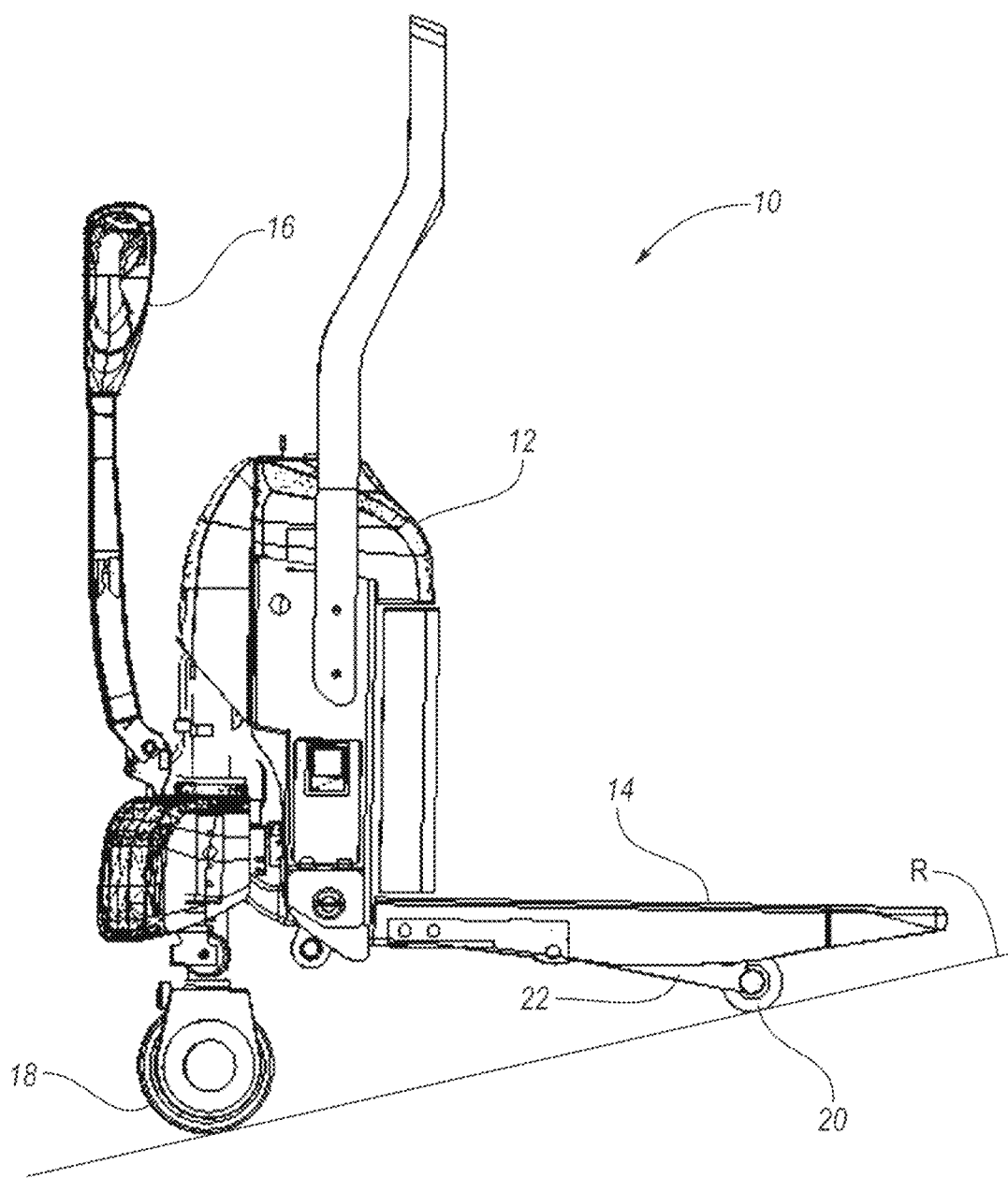
FIG. 5 shows the pallet lift of FIG. 1 traveling up the ramp R (or other incline).

Referring to FIG. 5, the pallet lift 10 may also be configured to provide leveling of the platform 14 while the pallet lift 10 is traveling up the ramp R (or other incline). In FIG. 5, the distance between the base 12 and the rear wheel 18 is increased by the rear actuator 30 (FIG. 2) more than the distance between the platform 14 and the load wheels 20 by front actuator 32 (FIG. 2). This can be implemented because the actuators for raising the base 12 and raising the platform 14 are independent of one another. Again, the actuators could be controlled by a microprocessor or hardwired circuitry or control logic based upon one or more sensors (such as a three-axis accelerometer and optionally a gyroscope) in the base 12 that determines the direction of gravity and maintains the platform 14 orthogonal to gravity.

Figure 6:
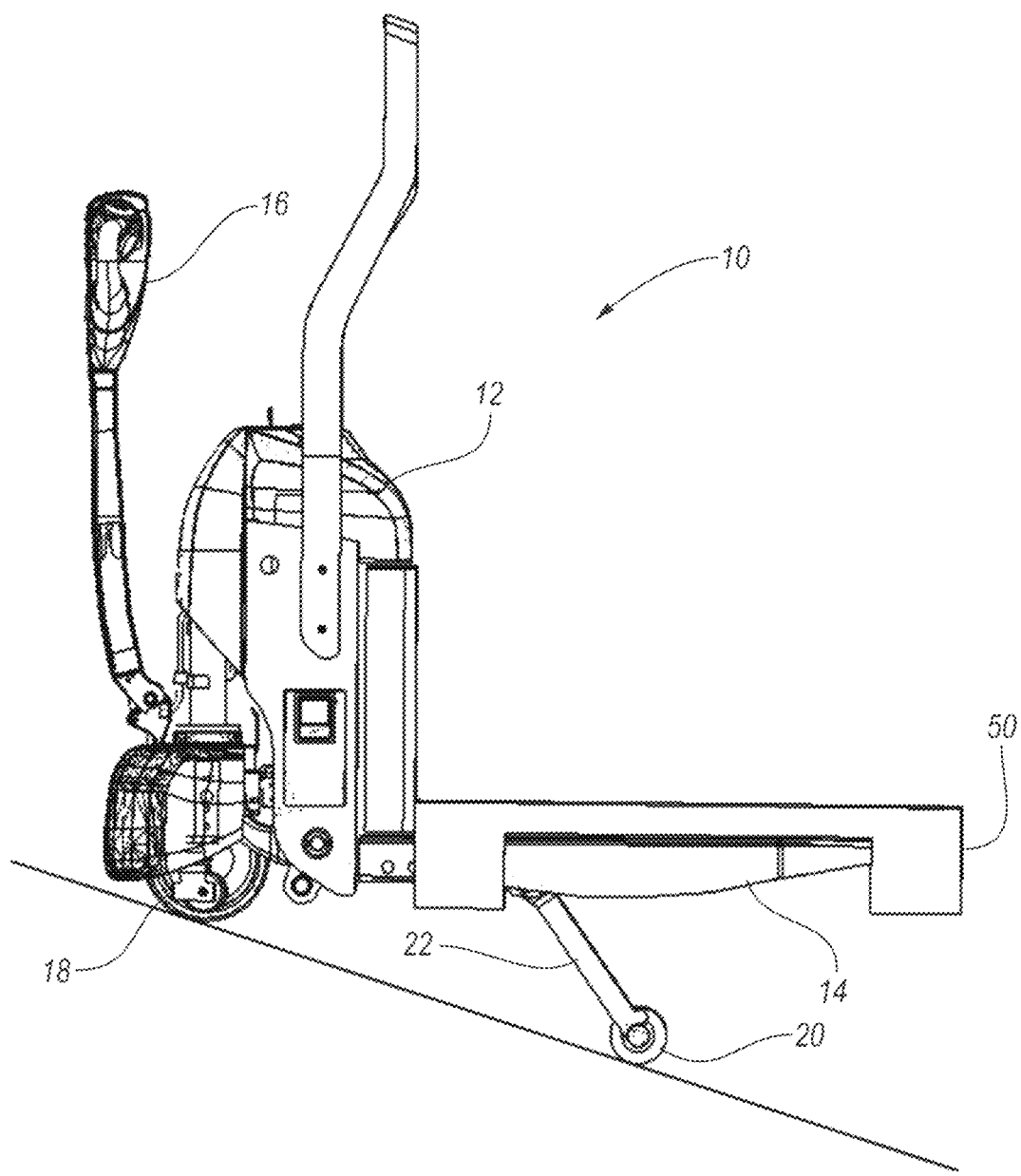
FIG. 6 shows the pallet lift of FIG. 1 carrying a pallet down a ramp.

FIG. 6 shows the pallet lift 10 carrying a pallet 50 down a ramp. As shown, the arms 22 are pivoted downward substantially so that the load wheels 20 are moved a much greater distance from the platform 14 than the rear wheel 18 is moved from the base 12. In this manner, the pallet 50 is maintained substantially level relative to earth.

Figure 7:
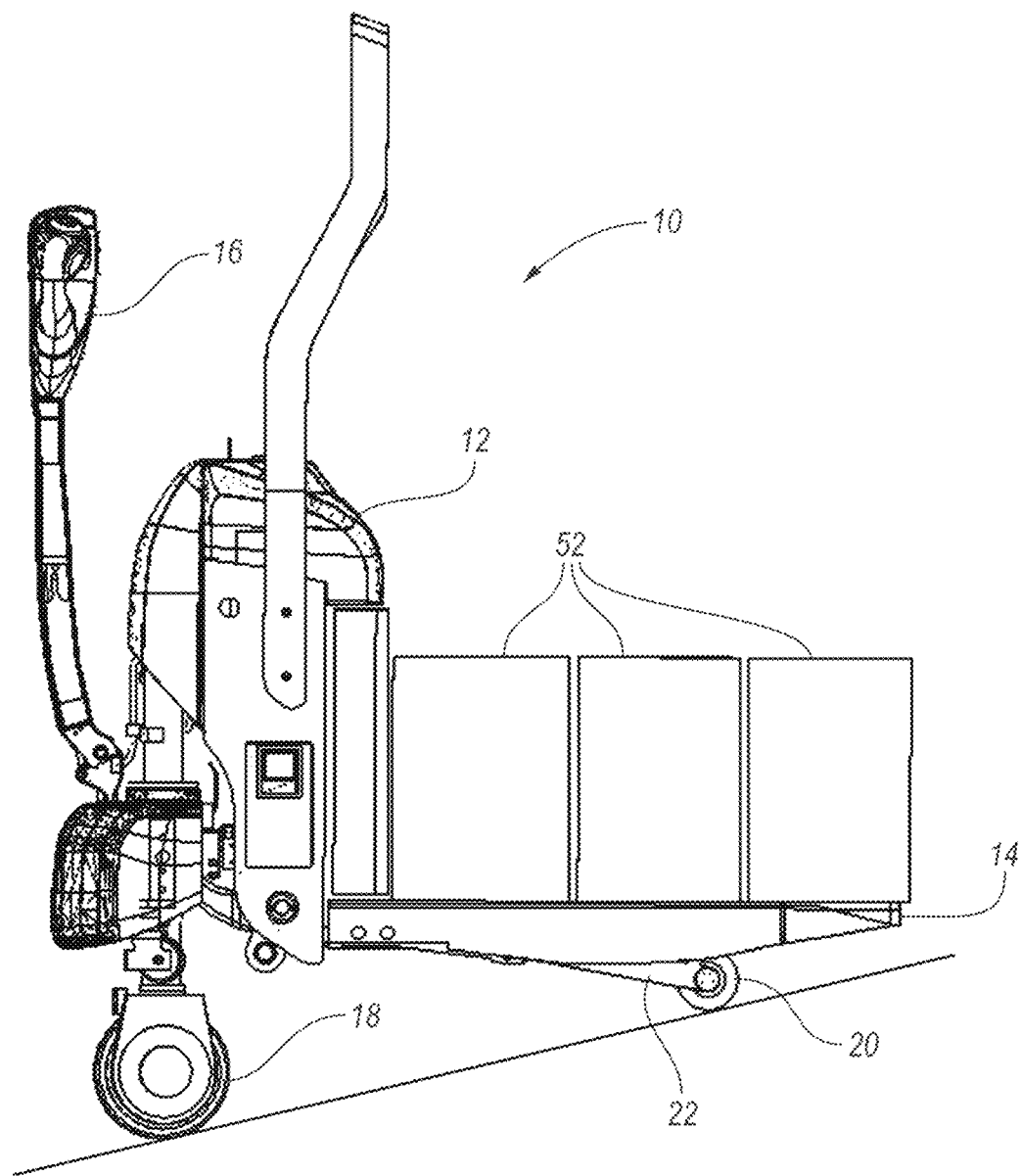
FIG. 7 shows the pallet lift carrying products up an incline (such as a ramp).

FIG. 7 shows the pallet lift 10 carrying products 52 (in this example, boxes) up an incline (such as a ramp). Again, the sensors on the pallet lift 10 detect the direction of gravity and maintain the platform 14 orthogonal to gravity. In this case, the controller automatically causes the rear actuator 30 to extend the rear wheel 18 downward from the base 12 significantly more than the front actuator 32 extends the load wheels 20 from the platform 14. Again, either or both the load wheels 20 and the rear wheel 18 can include a motor (such as a hub motor) for propelling the pallet lift 10 up the incline.

Figure 8:
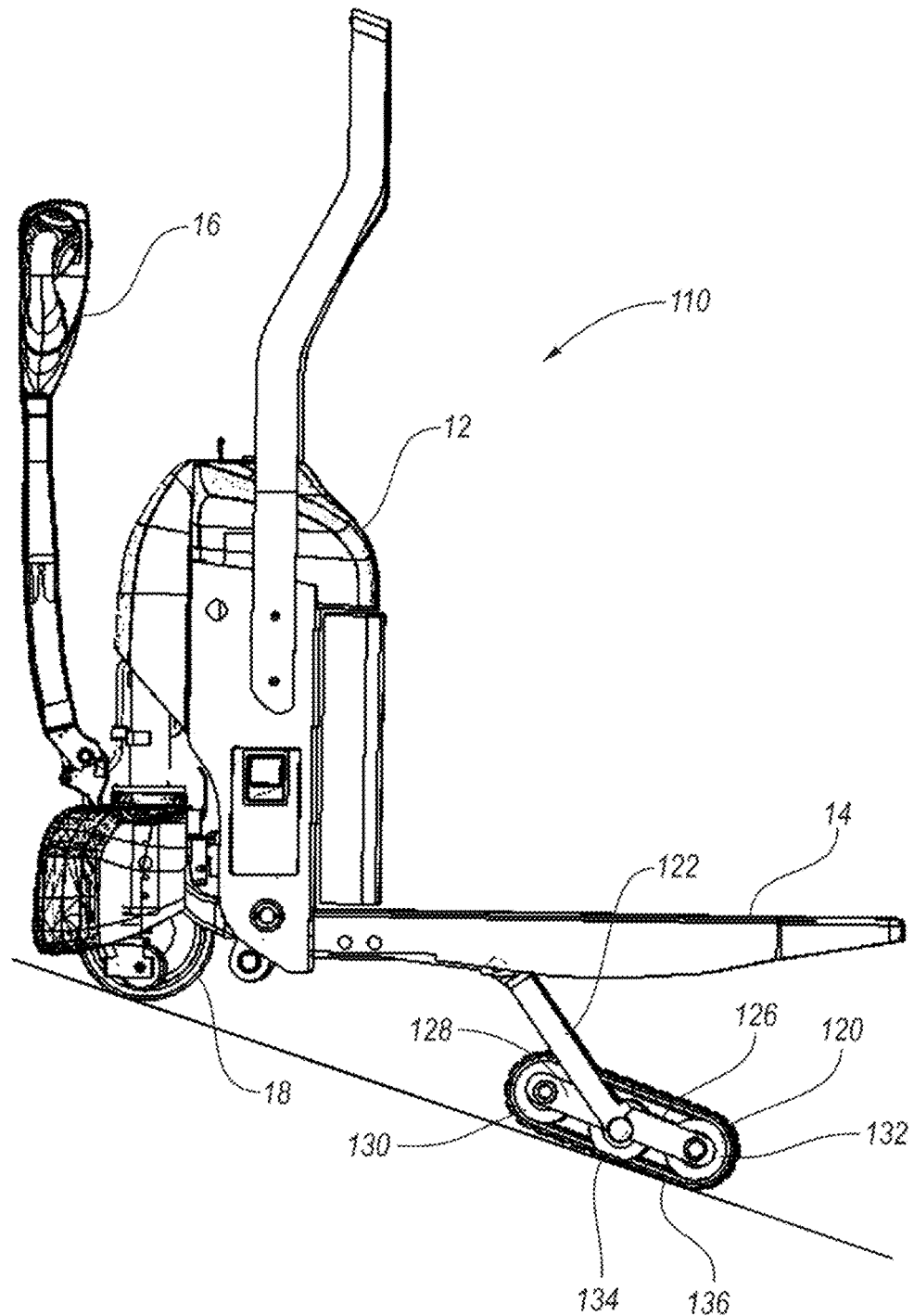
FIG. 8 shows a ramp delivery system according to a second embodiment, which is a pallet lift, traveling down a ramp.

FIG. 8 shows a ramp delivery system according to a second embodiment, which is a pallet lift 110. The pallet lift 110 includes the same base 12, platform 14, tiller arm 16, rear wheel 18 and actuators 30, 32 (FIG. 2) as before. The load wheels in this embodiment are each continuous track systems 120 each with a plurality of wheels 130, 132, 134 (in this example, three) all encircled by a tread 136. A pair of arms 126, 128 extend away from a lower end of each arm 122. The center wheel 134 is rotatably connected at a lower end of the arm 122. The outer wheels 130, 132 are rotatably connected at ends of the arms 126, 128. The continuous track systems 120 pivot relative to the lower end of the arm 122. The continuous track systems 120 enable the pallet lift 110 to traverse up and down stairways, rough terrain, curbs, and uneven surfaces. Otherwise, the pallet lift 110 operates in the same way described above with respect to FIGS. 1-7.

For example, in FIG. 8, the pallet lift 110 is traveling down an incline so the front actuator 32 (FIG. 2) extends the continuous track systems 120 from the platform 14 by a distance greater than the rear actuator 30 (FIG. 2) extends the rear wheel 18 from the base 12 to maintain the platform 14 orthogonal to gravity.

Figure 9:
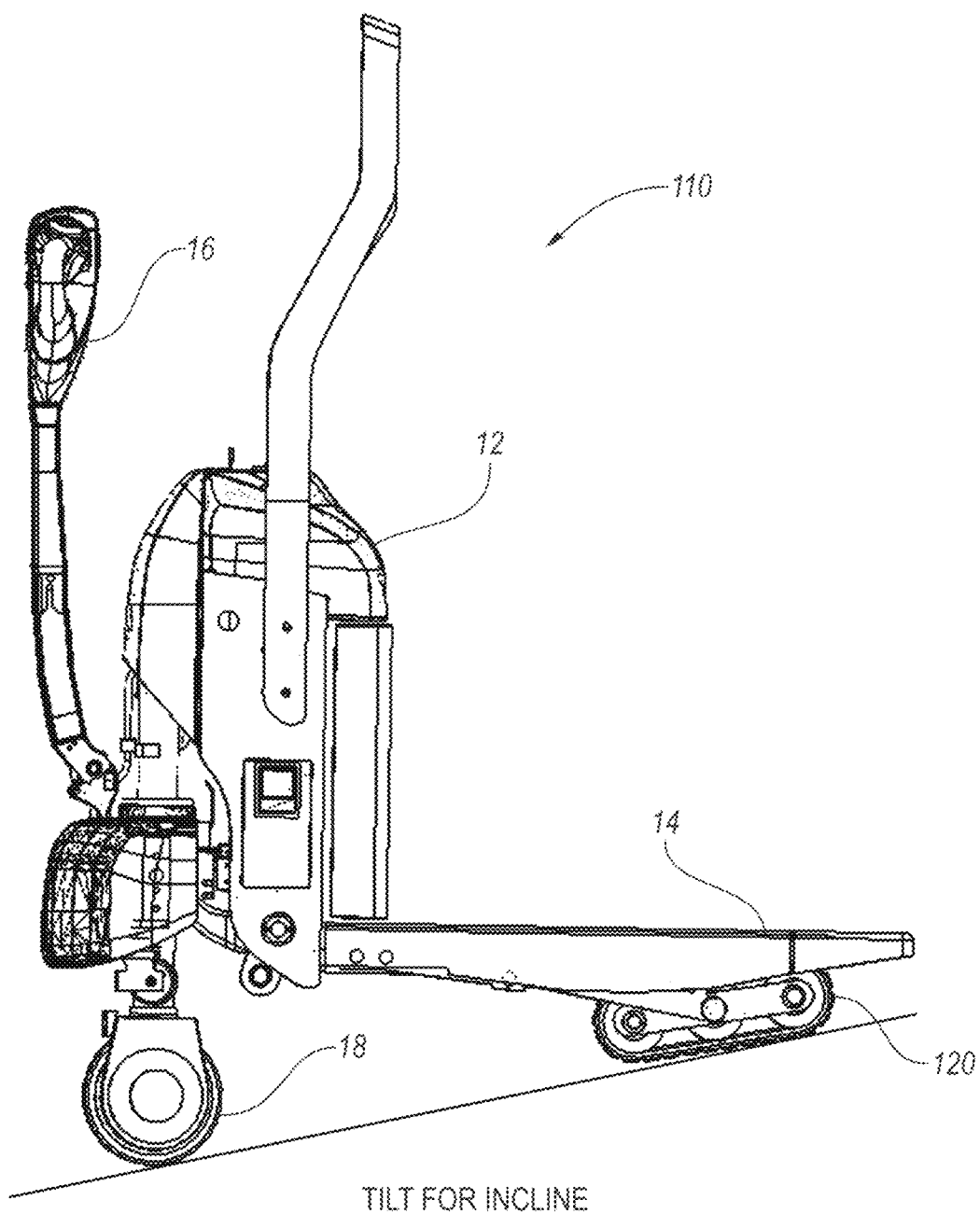
FIG. 9 shows the pallet lift of FIG. 8 traveling up an incline.

In FIG. 9, the pallet lift 110 is traveling up an incline, so the rear wheel 18 extends further from the base 12 than the continuous track systems 120 does from the platform 14 to maintain the platform 14 level relative to earth.

Figure 11:
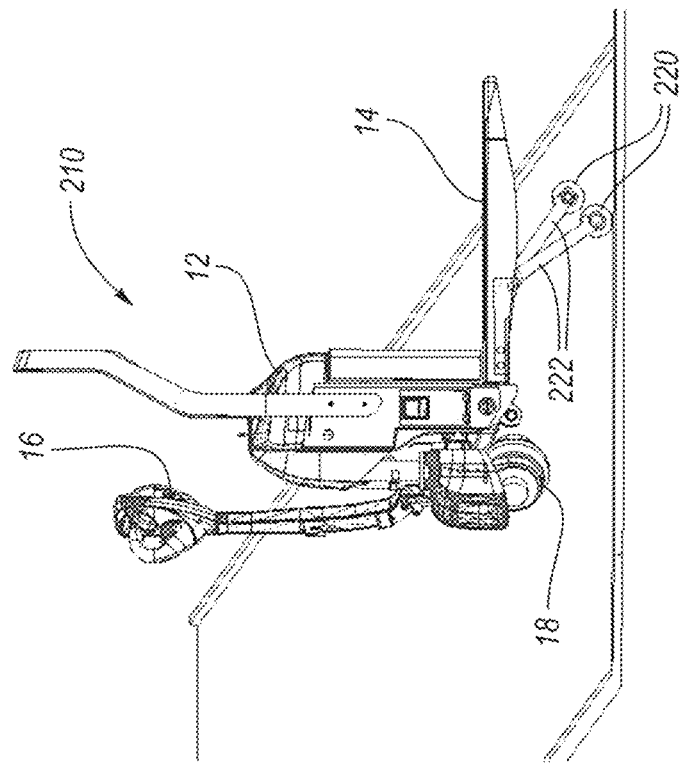
FIGS. 10 and 11 show a third embodiment of a ramp delivery system, which is again a pallet lift, traveling at an angle down a ramp.
Figure 10:
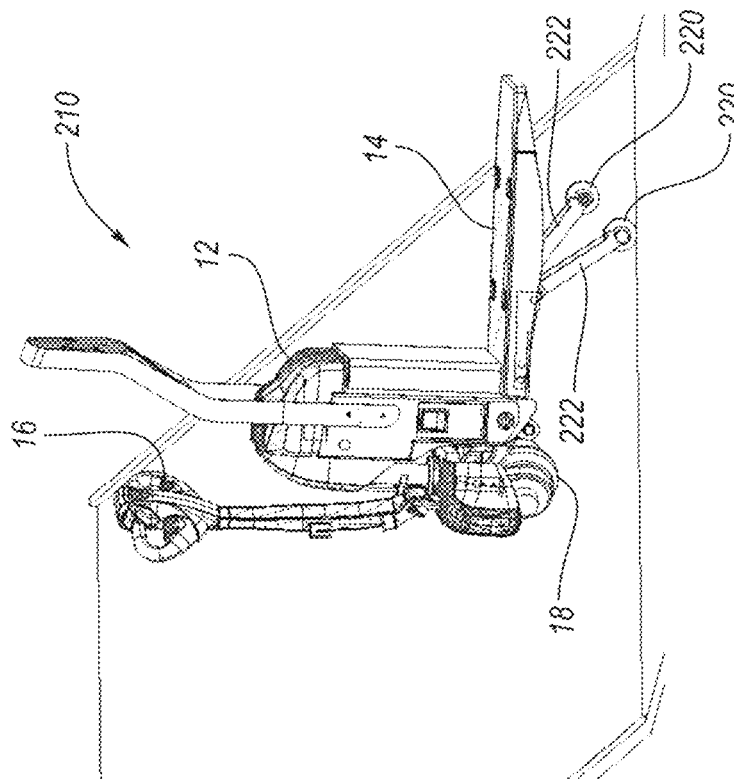

FIGS. 10 and 11 show a third embodiment of a ramp delivery system, which is again a pallet lift 210. Again, the base 12, platform 14, tiller arm 16 and rear wheel 18 may be the same as above. In the pallet lift 210, the arms 222 are configured to be actuated independently from one another (as well as independently of the rear wheel 18). For example, there would be two front actuators 32, one for each of the arms 222. In this manner, the pallet lift 210 provides control of the tilt of the platform 14 about two axes. By extending one of the arms 222 more than the other, the pallet lift 210 can control the tilt of the platform 14 about the longitudinal axis of the platform 14 (roll). This can maintain the stability of a load on the platform 14 on uneven terrain, or if the pallet lift 210 travels at an angle down an incline as shown. Again, a three-axis accelerometer or two-axis accelerometer and/or other sensors, such as a gyroscope, can indicate the orientation of the pallet lift 210 relative to gravity and a controller on board the pallet lift 210 can deploy the rear wheel 18, and each of the arms 222 an appropriate distance to maintain the platform 14 orthogonal (or substantially orthogonal) to gravity.

In one embodiment the load is kept level by tilting the load platform separately from the rest of the system, so that the system normal vector is parallel with the ramp normal vector and the load platform normal vector is parallel with the gravitational normal vector.

In another embodiment the wheels could lift independently, providing tilt to the whole lift or it could just tilt the platform.

The system could have a removable platform so that different sized platforms could be used with the same lift. This would allow the lift to be optimized for different load sizes or delivery needs.

The system could also have attachment points so that accessories to carry specialized containers can be quickly attached, such as a cylindrical racks to house beer kegs or CO2 bottles used in the beverage industry.

The system could be stowed either inside or outside the delivery vehicle on a specialized storage platform or enclosure which includes provisions to recharge the system and secure the system during transportation.

Battery charging could commence automatically once the system is in stowage. The charging method could be wireless, self-connecting magnetic plugs, large sprung pads that contact when stowed.

The platform or enclosure could have an integrated ramp so that a separate ramp is not needed. The ramp could be hinged, folding, or the stowage platform could be the ramp itself. The ramp could be counterweighted or spring assisted to make opening and closing easier. Counterweighting and assistance could be done with springs, pneumatically, hydraulically, or electrically.

In another embodiment the load could be automatically leveled by suspending the load platform similar to a swing and utilizing gravitational force to keep the load platform level. In this embodiment damper[s] could be used to prevent the load from oscillating.

In a simple embodiment the amount of tilt could be controlled manually by the operator at his discretion either physically or electronically. The auto tilt could be turned on by a button, switch, or automatically turn on after sensing the system is on a grade.

In all of the embodiments described herein, it may be desirable to maintain the platform 14 in a desired orientation other than strictly orthogonal to gravity. For example, it may be desirable to achieve a desired orientation wherein the platform 14 is tilted back toward the base 12 (or a backrest) slightly for stability. Also, the desired orientation of the platform 14 may be any angle depending on what is being supported on the platform 14 and how/whether the item being supported on the platform 14 is secured to the platform 14.

Figure 12:
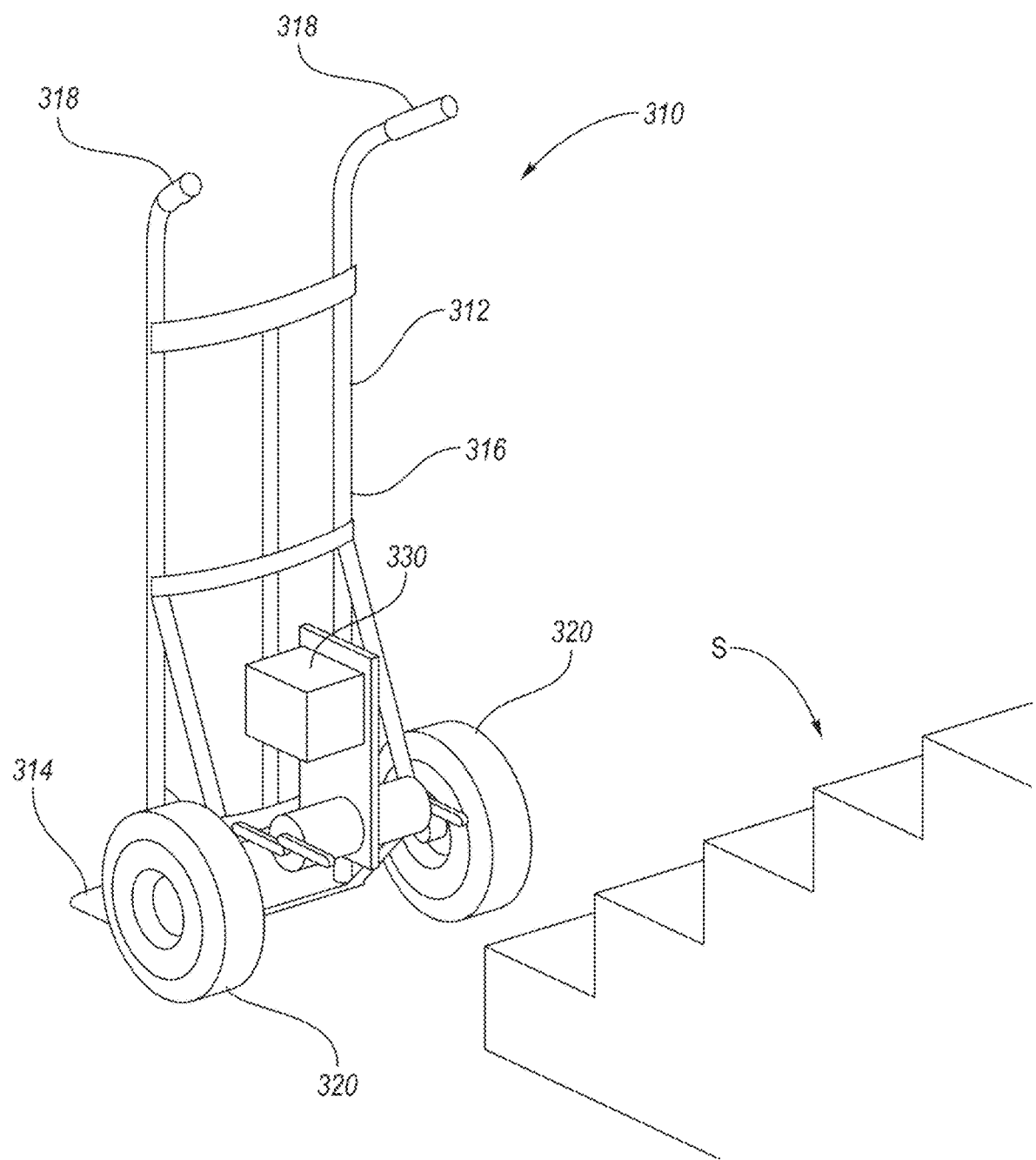
FIG. 12 shows a delivery system according to another embodiment.

A delivery system 310 according to another embodiment is shown in FIG. 12. A standard hand cart 312 is shown having a support platform 314 a vertical support 316 and handles 318. A pair of wheels 320 are mounted to a lower end of the vertical support 316.

A stair climbing device 330 according to one embodiment is shown removably secured to the hand cart 312. The detachable stair climbing device 330 allows a user to attach the device to the system (such as the hand cart 312) to safely and efficiently carry a load up and down stairs when needed, but have the benefits of a lighter and more maneuverable piece of equipment when not.

In this embodiment the stair climbing device 330 could be stored in the delivery vehicle and attached to a piece of equipment like a cart or hand cart 312 when the user needs to bring a load up or down stairs.

Figure 13:
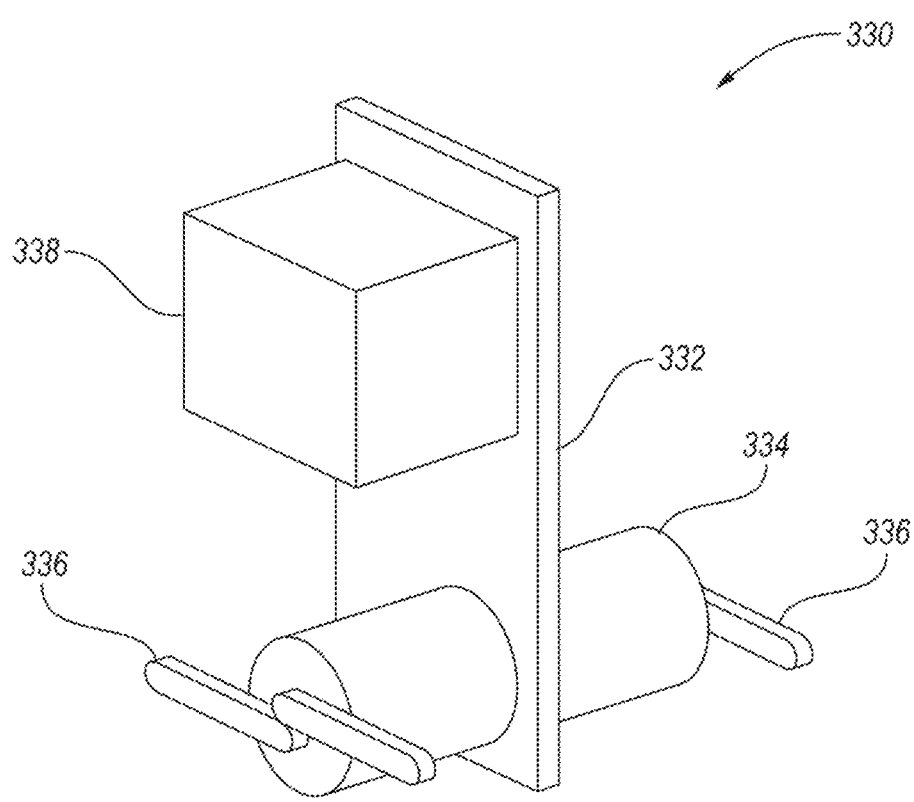
FIG. 13 shows the stair climbing device of FIG. 12.

Referring to FIG. 13, the stair climbing device 330 includes a base 332, such as a metal plate. A motor 334 is mounted to the base 332. Rods 336 are mounted at opposite ends of the motor 334. The rods 336 are perpendicular to the long axis of the motor 334. When the motor 334 is activated, the rods 336 rotate about the long axis of the motor 334. A battery 338 or other power source is mounted to the base 332 and is connected to the motor 334.

The stair climbing device 330 could be powered electrically by the battery 338. The battery 338 could be removeable or built in, and it could have charging features which make it convenient to be rechargeable in the delivery trailer.

In another embodiment, when it is used with delivery equipment other than the hand cart 312, the stair climbing device 330 could utilize the power source of the equipment it is being used with. The stair climbing device 330 could plug into the equipment or the equipment battery could be transferred to the stair climbing device 330.

In another embodiment the stair climbing device 330 could have a removable battery pack that could be charged by itself or within the stair climbing device 330.

Alternatively, the stair climbing device 330 could operate by a mechanical device, such as leverage or friction. It could use a foot pedal to raise the load step by step. It could use friction to slow the descent.

In one embodiment the stair climbing device 330 could have sensors integrated into the body that detect when to climb or descend automatically. The sensors could be physical such as a limit switch, optical such as laser/lidar style, others such as sonar or a combination of them. In another embodiment, the stair climbing device 330 could communicate with the delivery equipment electronically or mechanically to detect when to climb or descend.

Figure 14:
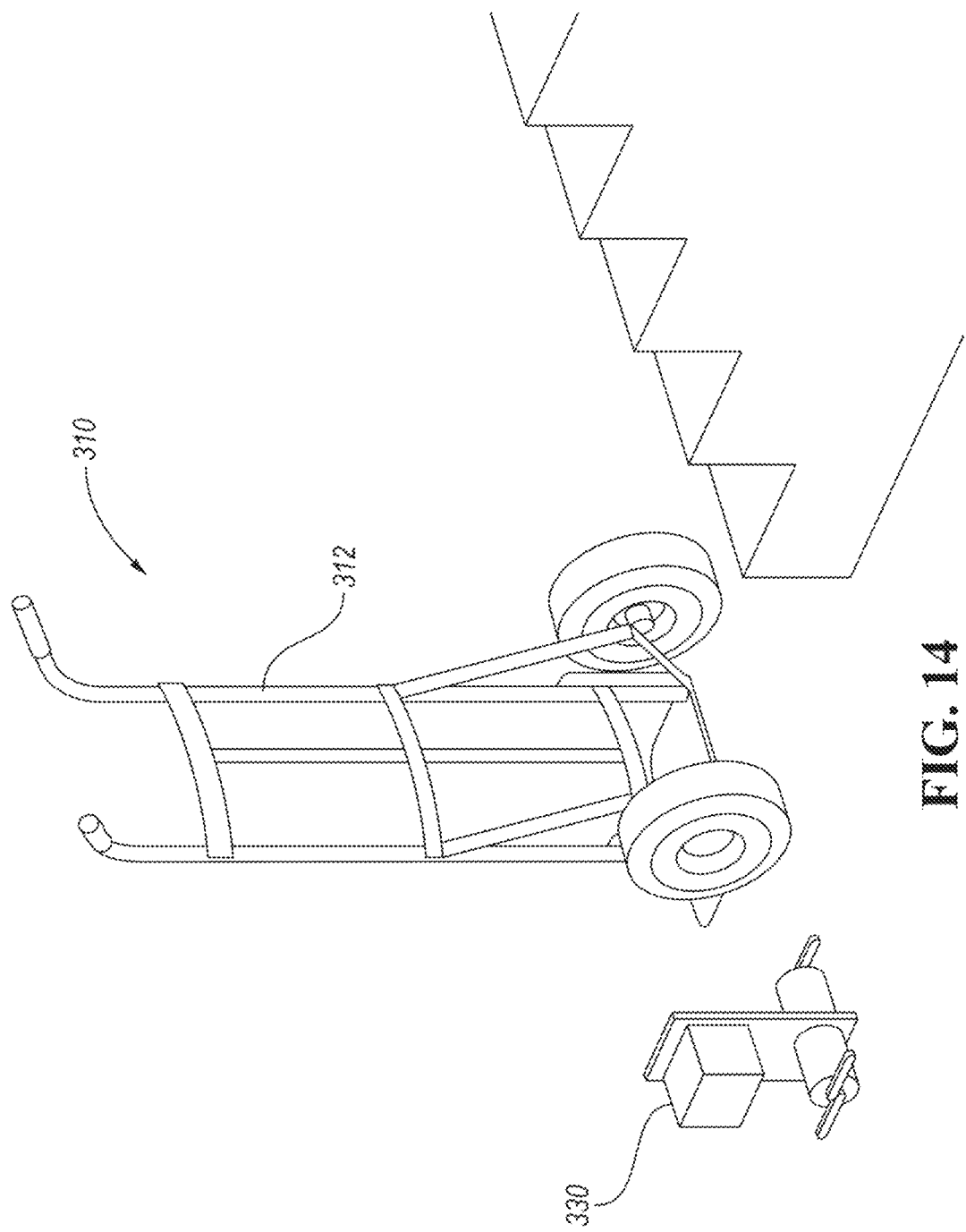
FIG. 14 shows the stair climbing device separated and hand cart of FIG. 12 disconnected from one another.

Referring to FIG. 14, the stair climbing device 330 can be selectively removed from the standard hand cart 312 so that the standard hand cart 312 can be used without the weight of the stair climbing device 330.

The method of attachment could be mechanical, magnetic, or a combination of the two. In one embodiment latches and catches could be used on the stair climbing device 330 and hand cart 312 to secure the two together quickly.

In another embodiment the stair climbing device 330 could be provided with a mounting kit so that it could be mounted to a range of delivery equipment besides the hand cart 312.

In another embodiment, the stair climbing device 330 could be a modular accessory to a powered piece of equipment and the quick attachment process could include a power plug to power the stair climbing device 330 from the main piece of equipment.

There could be controls on the stair climbing device 330 to climb or descend or the stair climbing device 330 could be controlled wirelessly by remote.

In one embodiment, the controls could be wired to the stair climbing device 330 and attach to the hand cart 312 for one handed operation. The control could attach with magnets, with Velcro straps, with a clasp, or another way of being secured to the hand cart 312 or other delivery equipment.

In another embodiment the control could be wireless and could be stored within the stair climbing device 330 then removed for use. The control could be battery operated and could be recharged by the hand cart 312 when not in use.

In another embodiment the controls could be built into the hand cart 312 or other delivery equipment, so that once the stair climbing device 330 is attached, they become active and functional.

In another embodiment, the stair climbing device 330 could attach magnetically and engage mounting features on the hand cart 312 (or other delivery equipment).

Figure 15:
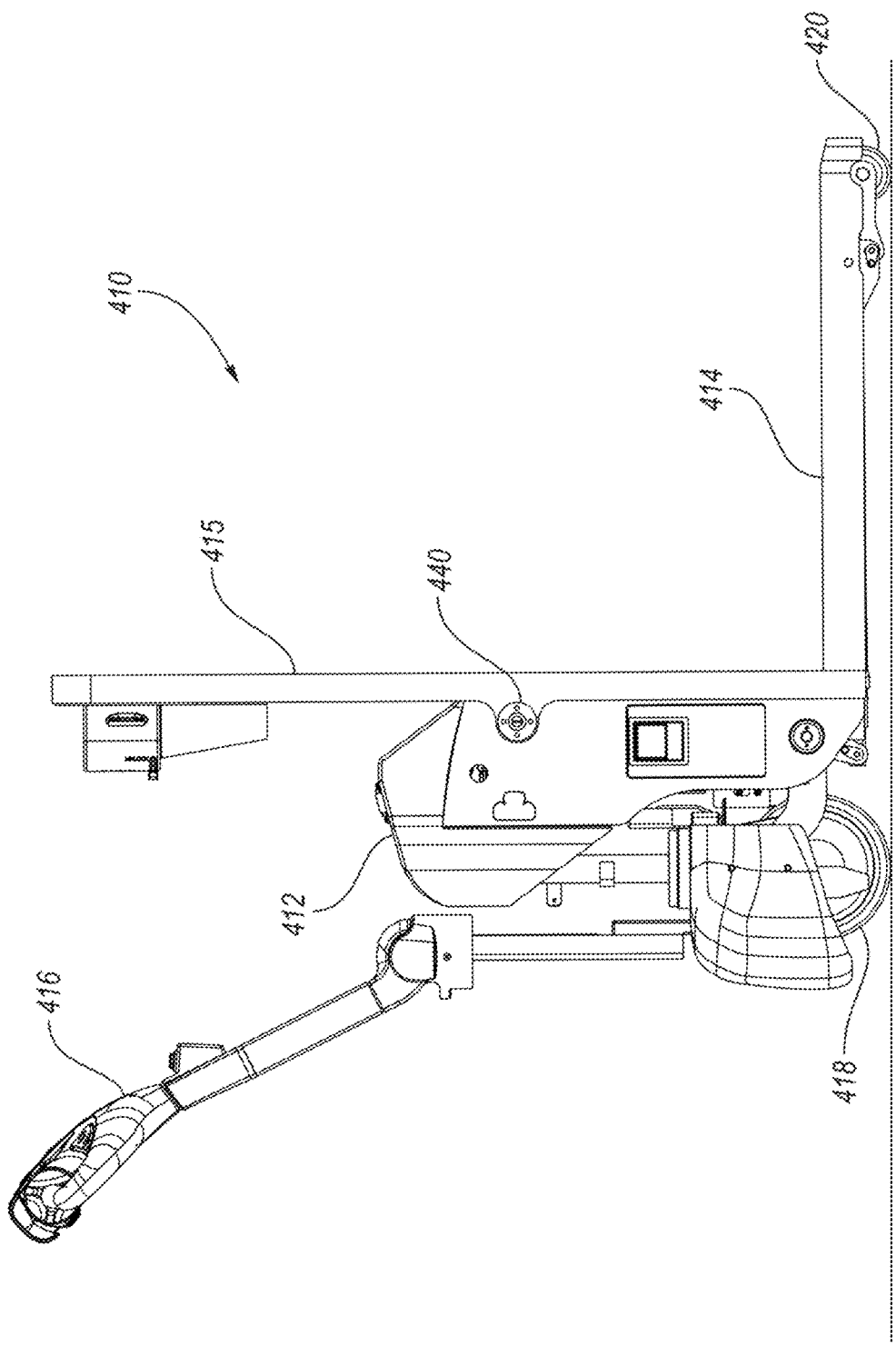
FIG. 15 shows another embodiment of a ramp delivery system, which is a pallet lift.

FIG. 15 shows another embodiment of a ramp delivery system, which is a pallet lift 410. The pallet lift 410 includes a base 412 and a platform 414 extending forward from the base 412. A backrest 415 extends upward from a rear end of the platform 414.

A tiller arm 416 is pivotably connected to the base 412 and is used to steer and control the pallet lift 410. A rear wheel 418 is mounted below the base 412 and may be pivoted by the tiller arm 416 to provide steering. Alternatively, the pallet lift 410 may have casters mounted below the base 412 and fixed handles could be mounted to the base 412 instead of the tiller arm 416.

Load wheels 420 (preferably two, but only one is visible in FIG. 15) support the platform 414. The platform 414 may comprise a solid platform (as shown in this example) or a pair of spaced-apart tines, depending on the type of pallets to be used with the pallet lift 410. Alternatively, in applications where a pallet will not be used and product will be placed directly on the platform 414, the lift function is not necessary so the load wheels 420 and rear wheel 418 can be set at a fixed height and the lift actuator 430 would be eliminated.

The load wheels 420 may be motorized, such as by having hub motors therein to drive, brake and control the pallet lift 410. Alternatively, or additionally, the rear wheel 418 may be motorized, such as by having a hub motor therein. The pallet lift 410 may in some aspects generally take the form of a pallet jack, with hydraulics or electric motors or actuators configured to lift the platform 414 relative to the floor.

The platform 414 and the backrest 415 are secured to one another or formed integrally to form a rigid L-shaped member. The backrest 415 is pivotably secured to the base 412 at an axis 440. The axis 440 is horizontal, i.e. generally parallel to the floor and parallel to the axes of the load wheels 420.

Figure 16:
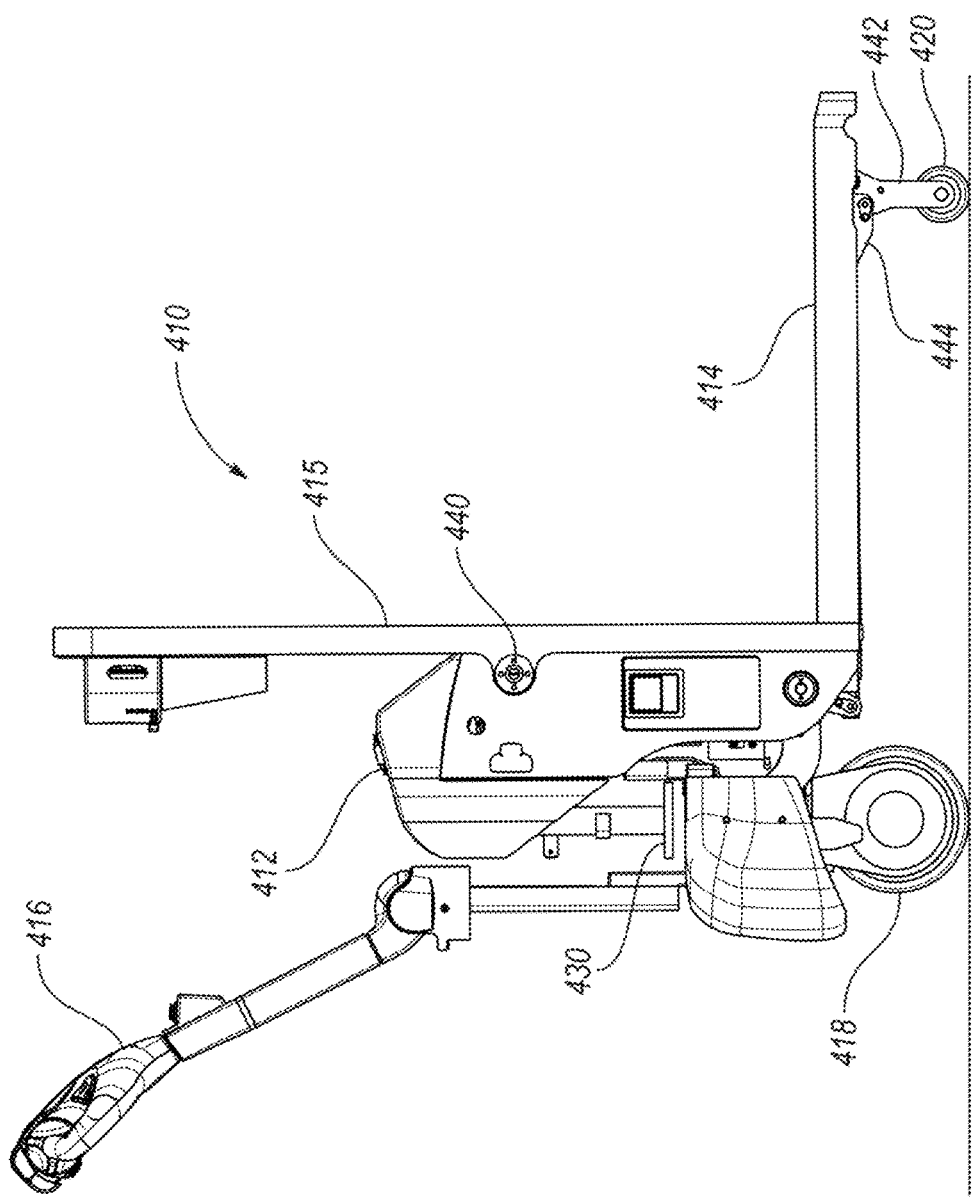
FIG. 16 is a side view of the pallet lift in the raised position, such as would be used to raise a pallet.

FIG. 16 is a side view of the pallet lift 410 in the raised position, such as would be used to raise a pallet (e.g. pallet 50 of FIG. 3) off the floor. As is known, a lift actuator 430 lifts the base 412 relative to the rear wheel 418. The lift actuator 430 may be a hydraulic cylinder, electric motor, linear actuator or other suitable actuator. Manual mechanical devices, such as levers and ratchets, could also be used. The lift actuator 430 is mounted between the rear wheel 418 and the base 412 and is configured to move the rear wheel 418 toward and away from the base 412 and, via linkage, to pivot the arms 442 and load wheels 420 toward and away from the tines 444. The lift actuator 430 and its configuration for raising and lowering the tines 444 relative to the floor may be similar to a conventional pallet jack.

Figure 17:
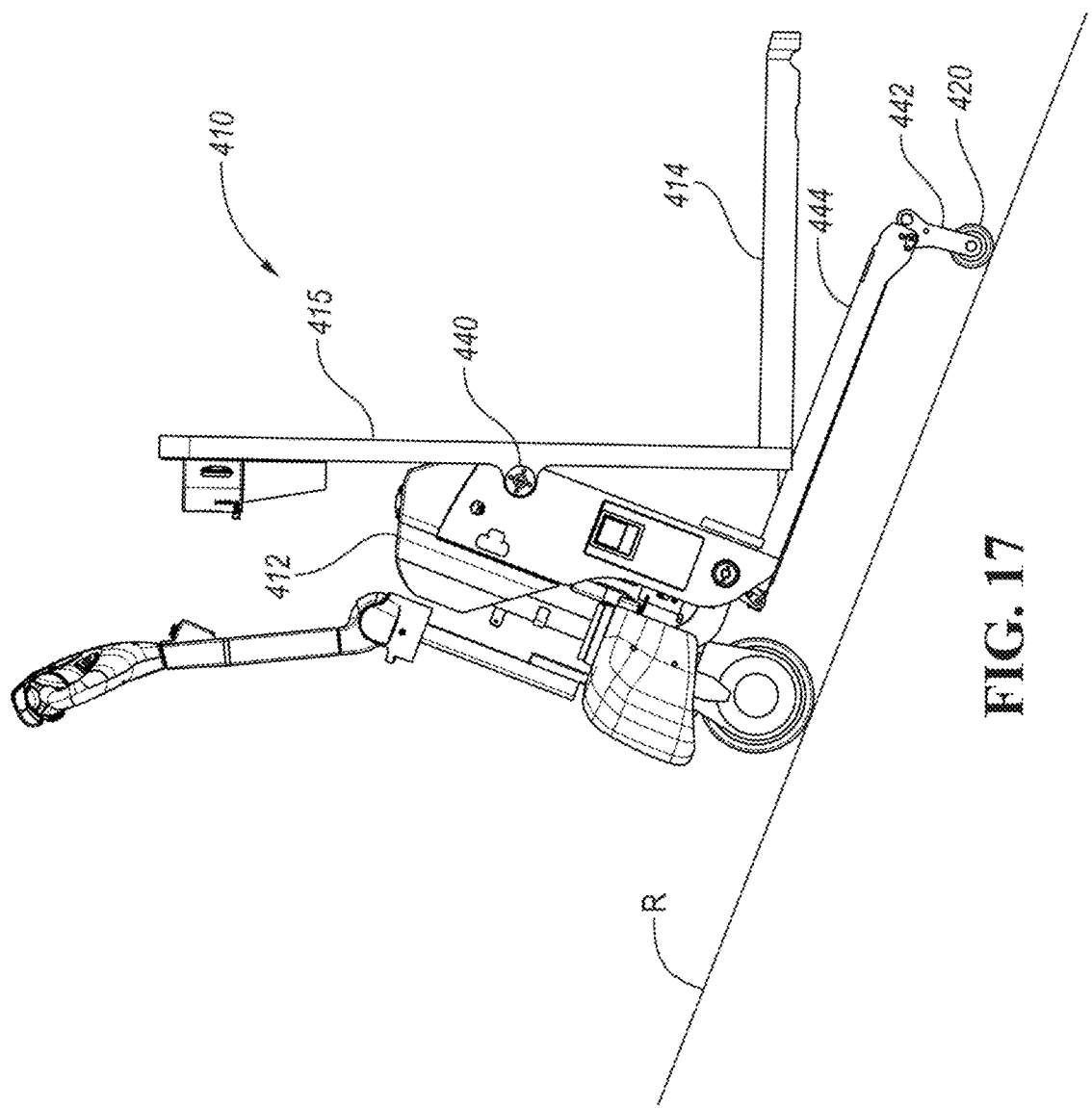
FIG. 17 shows the pallet lift of FIG. 16 traveling down a ramp.

In FIG. 17, the load wheels 420 are still pivoted downward on arms 442 to raise the tines 444 and the platform 414, and the rear wheel 418 is also moved away from the base 412. Again, in this configuration, a pallet (not shown) supported on the platform 414 would be lifted from the floor for transport by the pallet lift 410. As also shown in FIG. 17, the platform 414 and backrest 415 are pivotable relative to the base 412. The upper end of the backrest 415 has been pivoted rearward about the axis 440, thereby raising the front end of the platform 414.

The pallet lift 410 is on a ramp R that is tilted relative to a horizontal plane of the floor/earth (which is perpendicular to gravity). The platform 414 and backrest 415 are pivoted rearward about axis 440 while the pallet lift 410 travels down the ramp R. Preferably the platform 414 and backrest 415 are pivoted so that the upper support surface of the platform 414 is parallel to the floor (i.e. perpendicular to gravity) or tilted rearward slightly (e.g. approximately two degrees, again, still considered substantially perpendicular to gravity). This may be performed automatically as described herein based upon sensor input, or this may be performed manually by the operator. In this manner, a load, such as a loaded pallet, will be stable on the pallet lift 410 as the pallet lift 410 travels down (or up) the ramp R.

Figure 19:
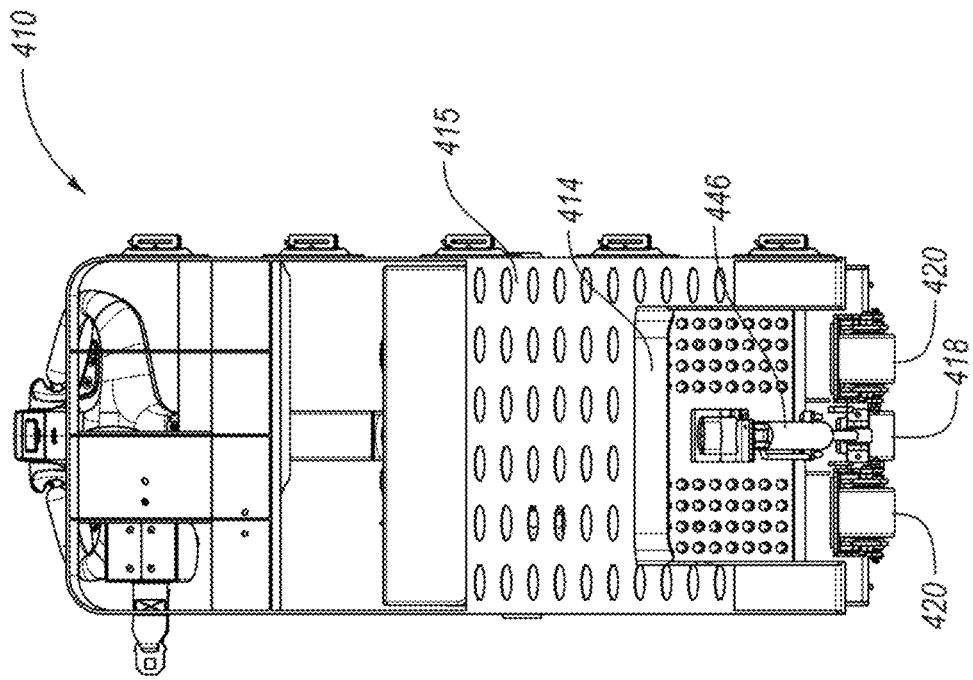
FIG. 19 is a front view of the pallet lift of FIG. 15 with the platform tilted back.
Figure 18:
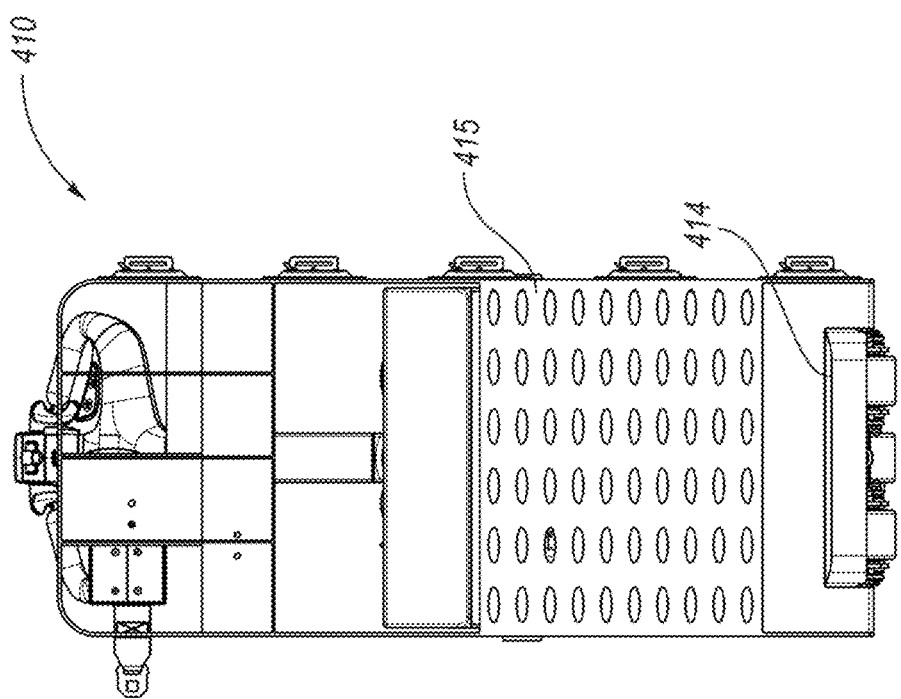
FIG. 18 is a front view of the pallet lift of FIG. 15.
Figure 20:
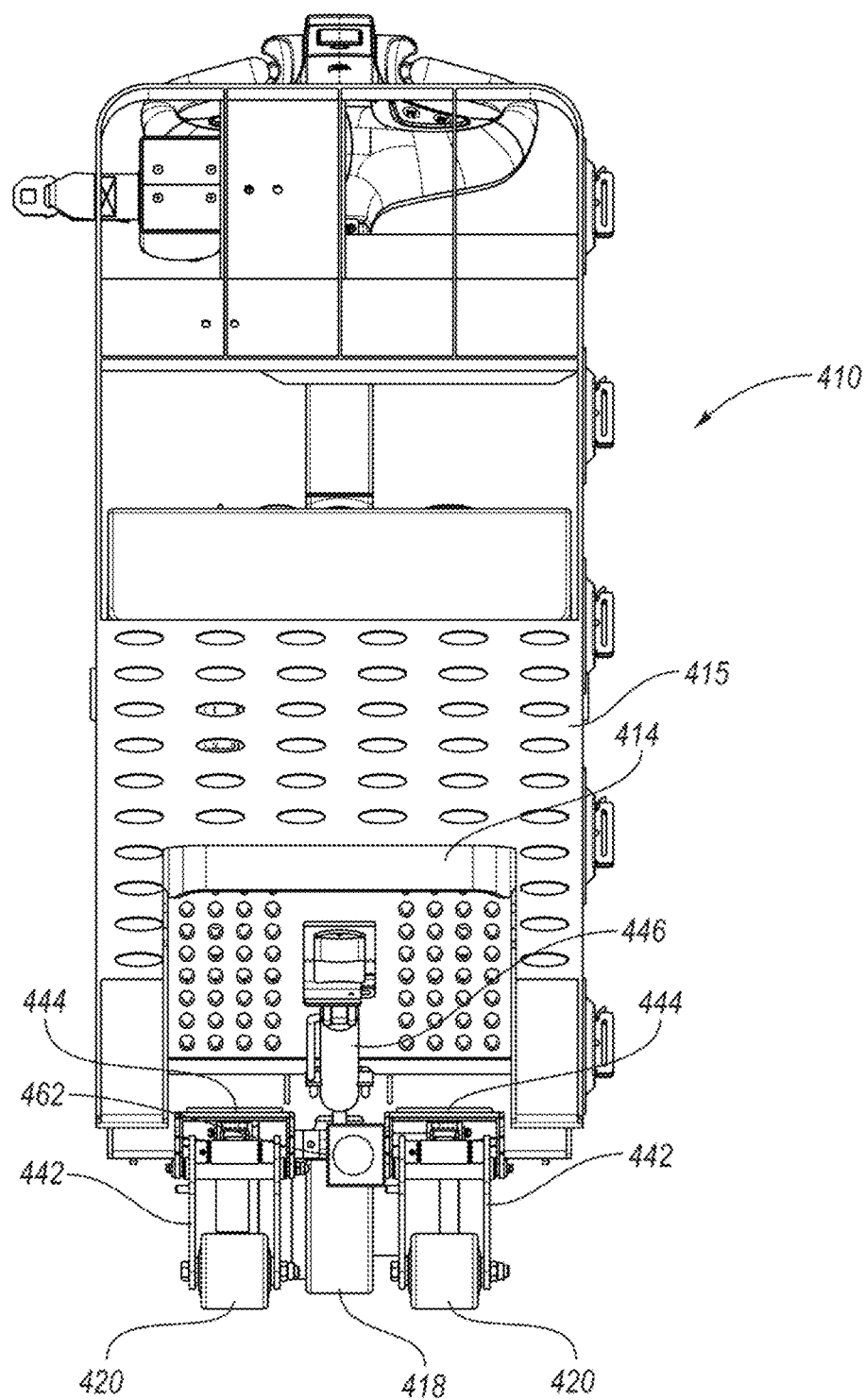
FIG. 20 is a front view of the pallet lift of FIG. 17, with the tines raised, the platform tilted back and with an optional camera.
Figure 21:
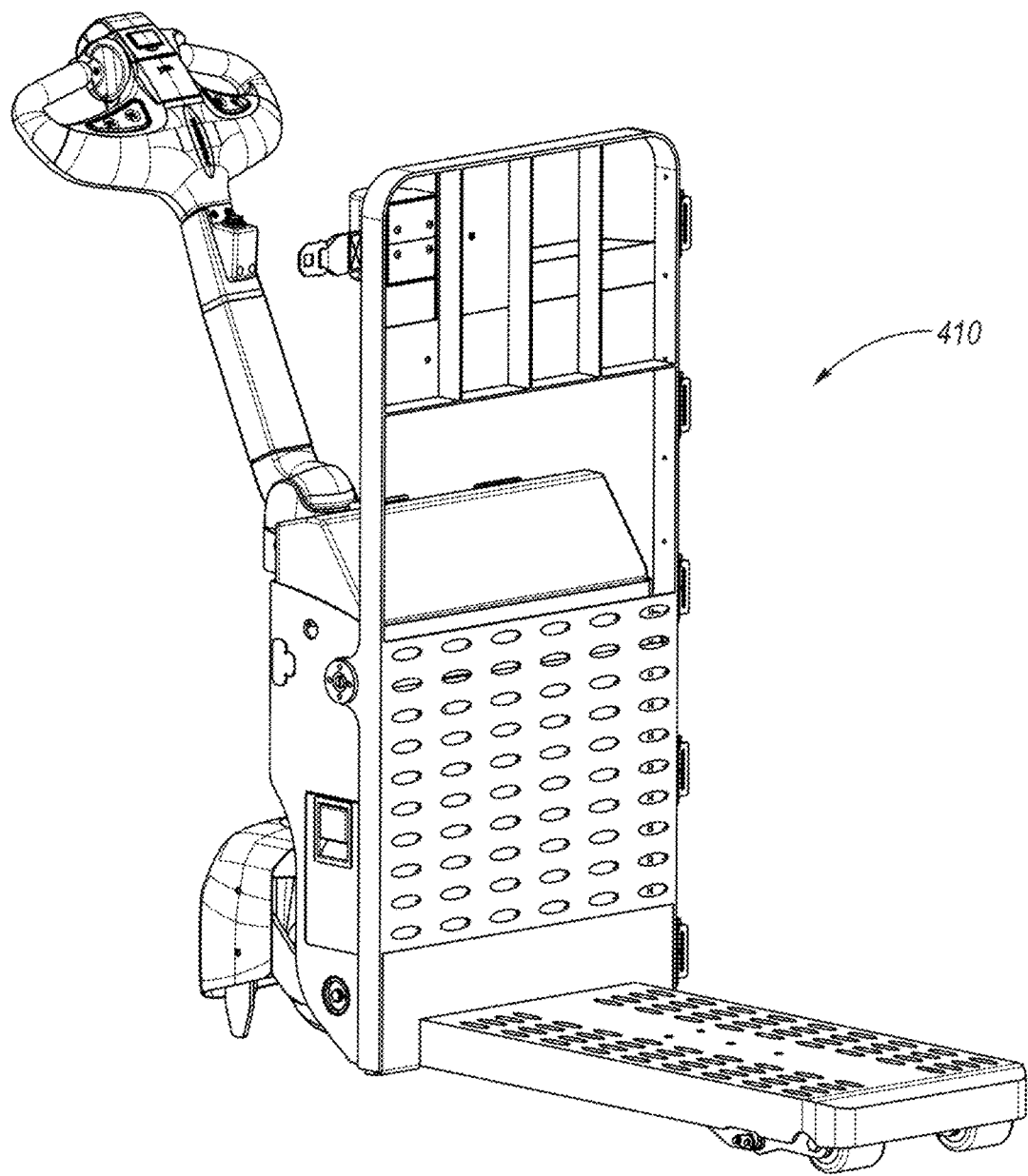
FIG. 21 is a front perspective view of the pallet lift of FIG. 15.
Figure 22:
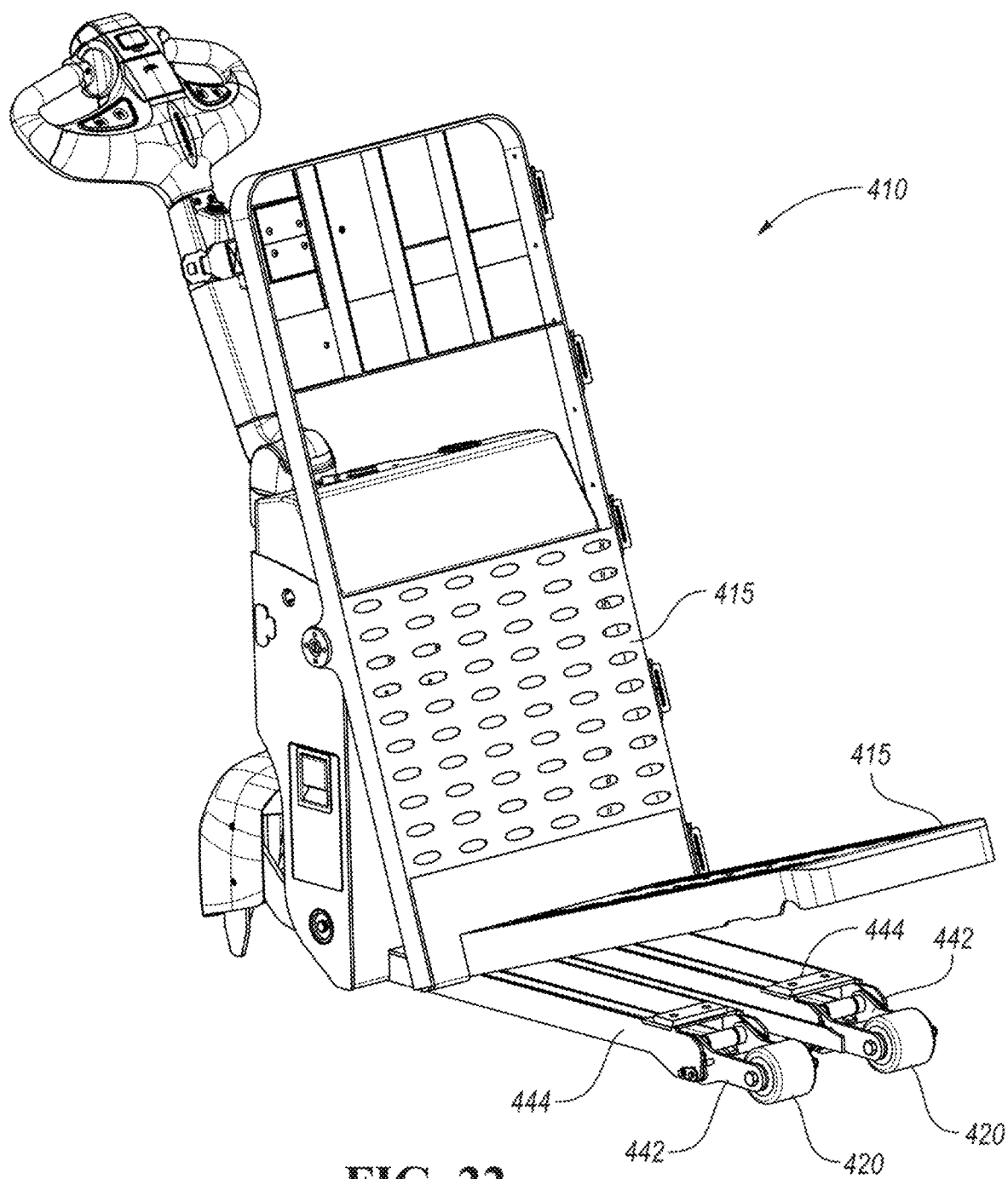
FIG. 22 is a front perspective view of the pallet lift of FIG. 19.
Figure 23:
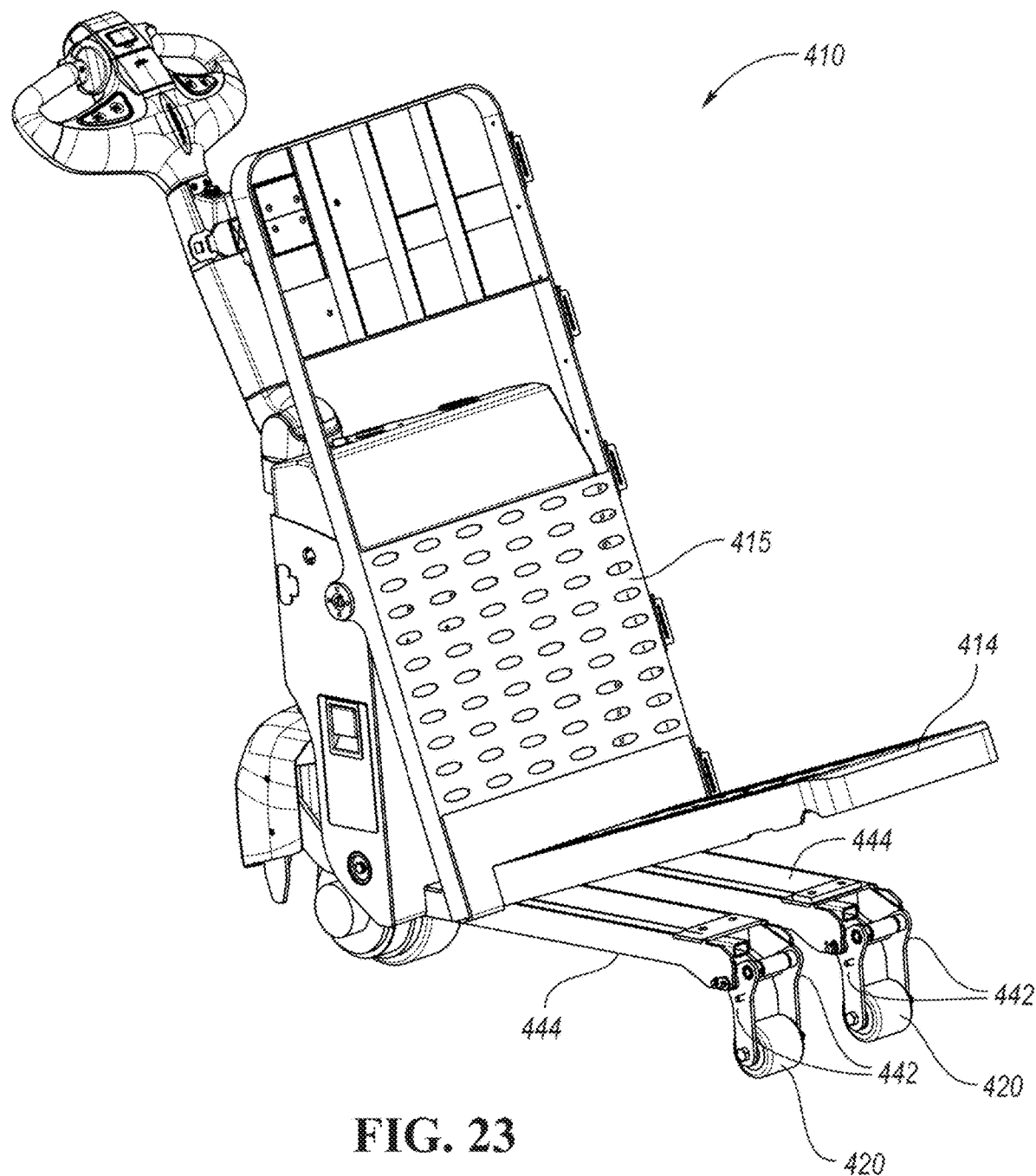
FIG. 23 is a front perspective view of the pallet lift of FIG. 17.

FIGS. 18-20 are front views of the pallet lift 410. FIGS. 21-23 are front perspective views of the pallet lift 410. In FIGS. 18 and 21, the platform 414 is in a lowered, horizontal position. In FIGS. 19 and 22, the platform 414 and backrest 415 are tilted rearward by a tilt actuator 446 secured to a forward end of the platform 414 and to the base 412. When the tilt actuator 446 expands, the forward end of the platform 414 is lifted, thereby tilting the platform 414 and backrest 415 rearward relative to the base 412 and the tines 444 as shown. The tilt actuator 446 may be a hydraulic cylinder, electric motor, linear actuator, or other actuator. Manual mechanical devices, such as levers and ratchets, could also be used.

Figure 24:
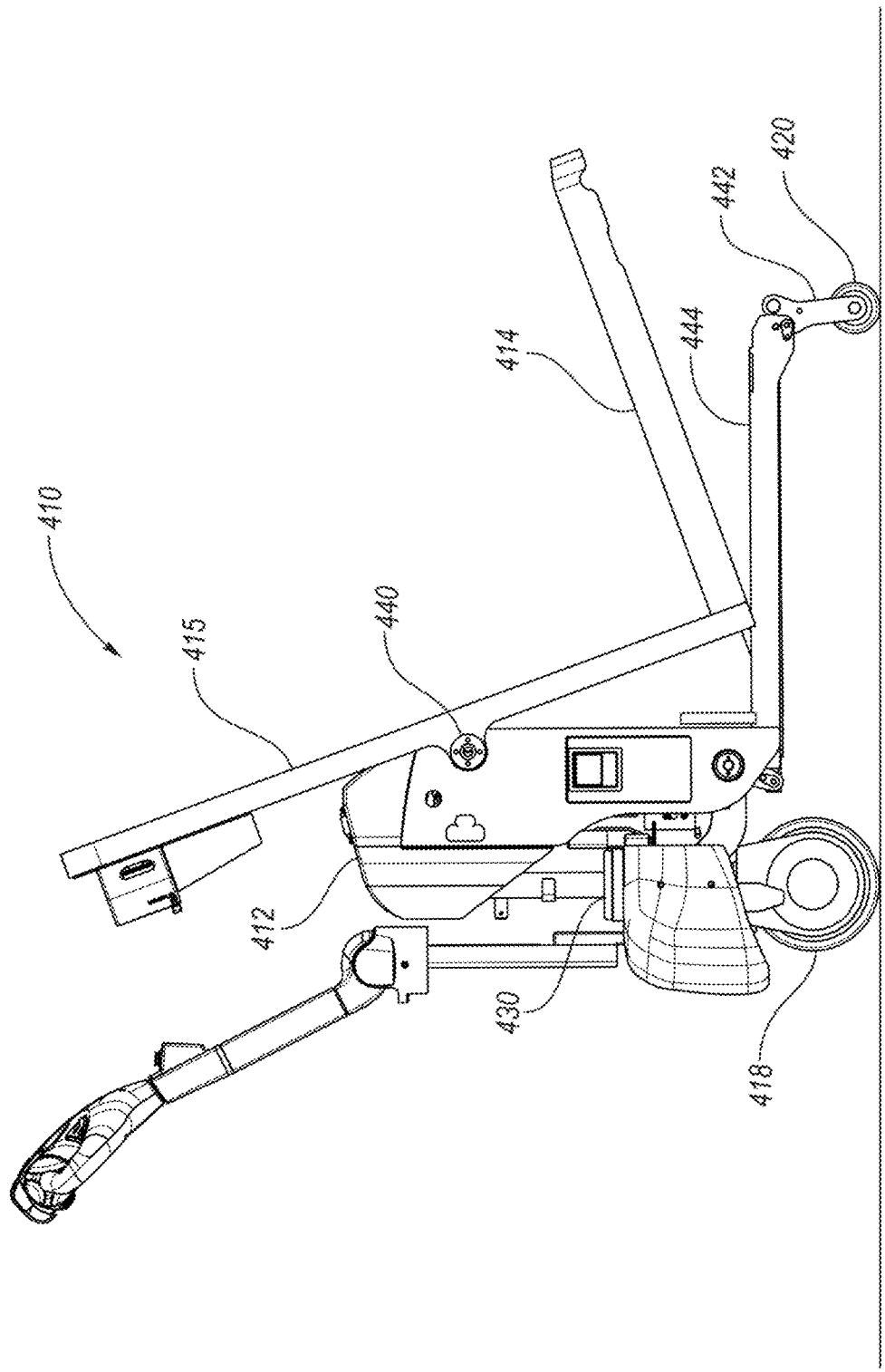
FIG. 24 is a side view of the pallet lift of FIG. 17.

In FIGS. 20, 23 and 24, the tines 444, base 412, platform 414 and backrest 415 are raised upward relative to the floor and relative to the rear wheel 418 and the load wheels 420. The platform 414 and backrest 415 are also tilted rearwardly relative to the base 412 and the tines 444.

As can be seen in FIGS. 20 and 23, the tines 444 are spaced apart and extend separately from the base 412. Together, the tines 444 can be considered a deck and the pair of spaced-apart tines could be secured to one another or replaced with a single, continuous deck. FIG. 20 shows the pallet lift 410 with an optional camera 462 mounted to one of the tines 444 and facing forward of the pallet lift 410. The camera 462 is mounted between the tines 444 in this example, but other locations may be suitable as well.

Figure 25:
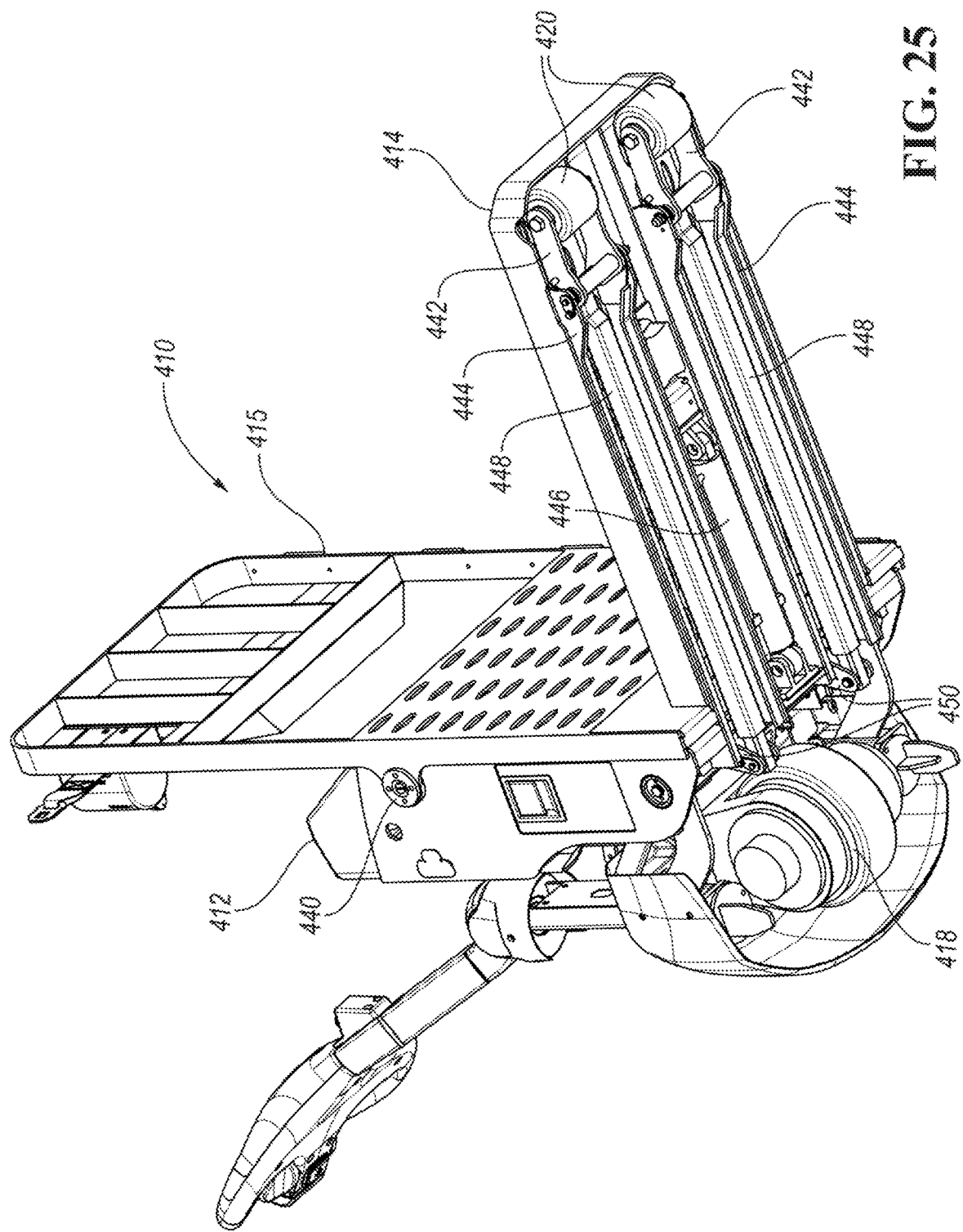
FIG. 25 is a bottom perspective view of the pallet lift.

FIG. 25 is a bottom perspective view of the pallet sled 410. Linkage 450 is coupled to each of a pair of push rods 448 leading to each arm 442. As is known, the linkage 450 (via the lift actuator 430) forces the push rods 448 forward and rearward parallel to the tines 444. As is known, the arms 442 are pivotably coupled to the tines 444 about an arm axis. The push rods 448 are also pivotably coupled to the arms 442 at a pushrod axis offset from the arm axis. Forward and rearward motion of the push rods 448 thus causes the arms 442 to pivot relative to the tines 444, thereby moving the load wheels 420 toward and away from the tines 444.

Figure 26:
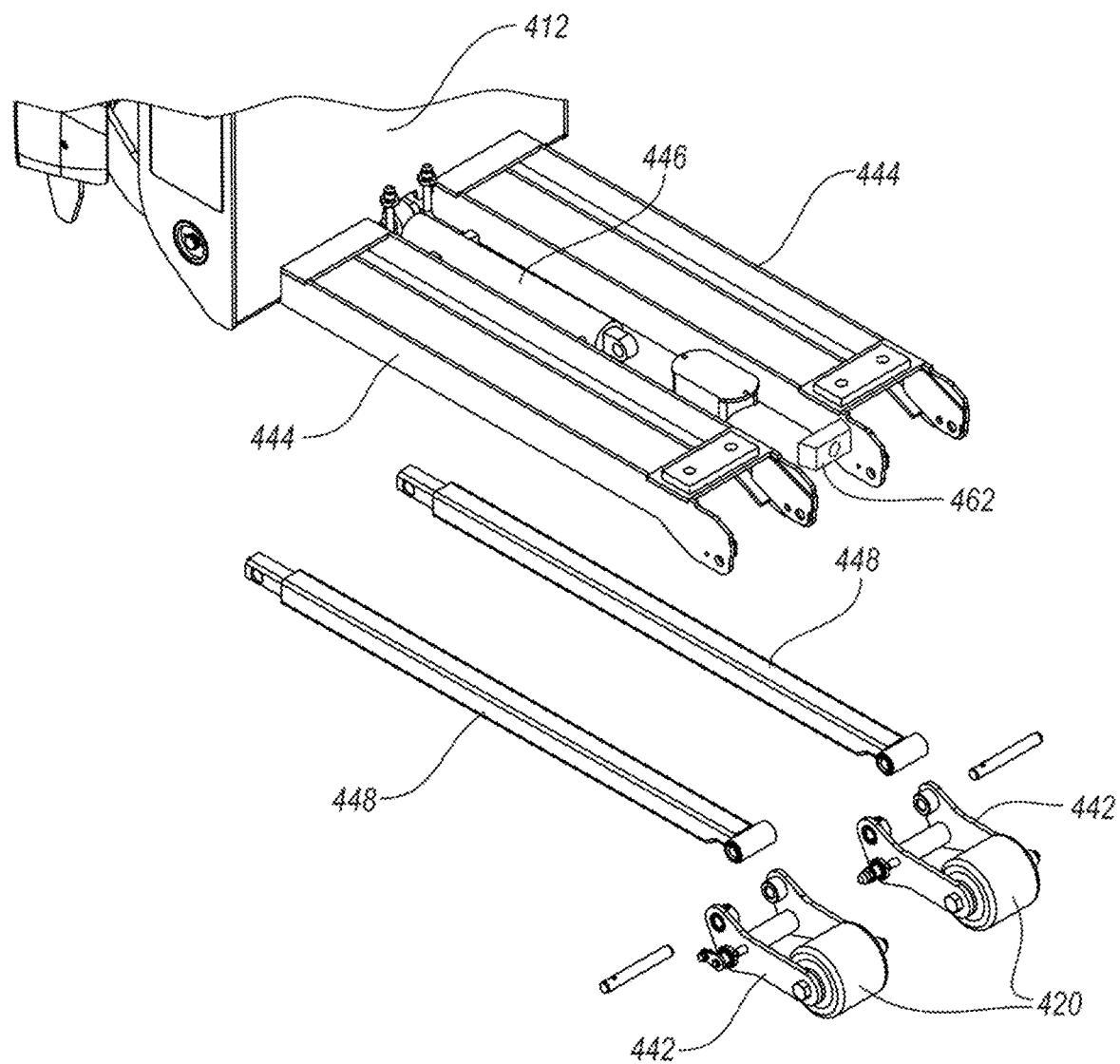
FIG. 26 is a partially exploded view of the pallet lift with the platform removed for visibility.

FIG. 26 is a partially exploded view of the pallet lift 410 with the platform 414 removed for visibility. The tines 444 extend forward from the base 412. The tilt actuator 446 is pivotably coupled to the base 412 between the tines 444. The push rods 448 are configured to be pivotably coupled to the arms 442 at pushrod axes offset from the arm axes about which the arms 442 pivot relative to the tines 444. The optional camera 462 is shown mounted to one of the tines 444 and directed forward of the pallet lift 410.

Figure 27:
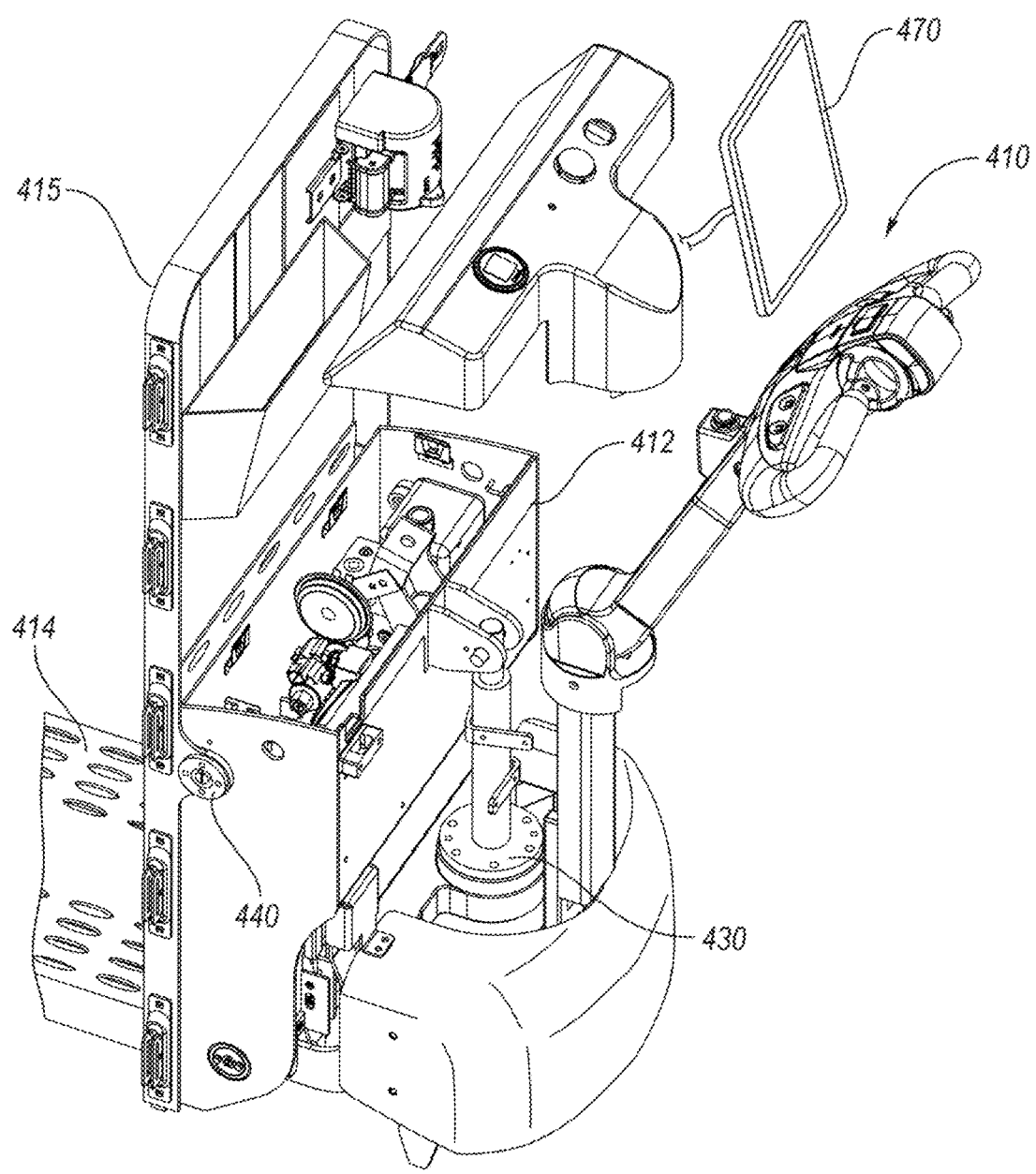
FIG. 27 is a partially exploded upper rear view of the base of the pallet lift.

FIG. 27 is a partially exploded upper rear view of the base 412 of the pallet lift 410. The lift actuator 430 is secured to a rear wall of the base 412. FIG. 27 shows an optional display 470 mounted to the base 412, which faces the user during use. The display 470 could be part of a mobile device, such as a tablet having a processor 454 (FIG. 29).

Figure 28:
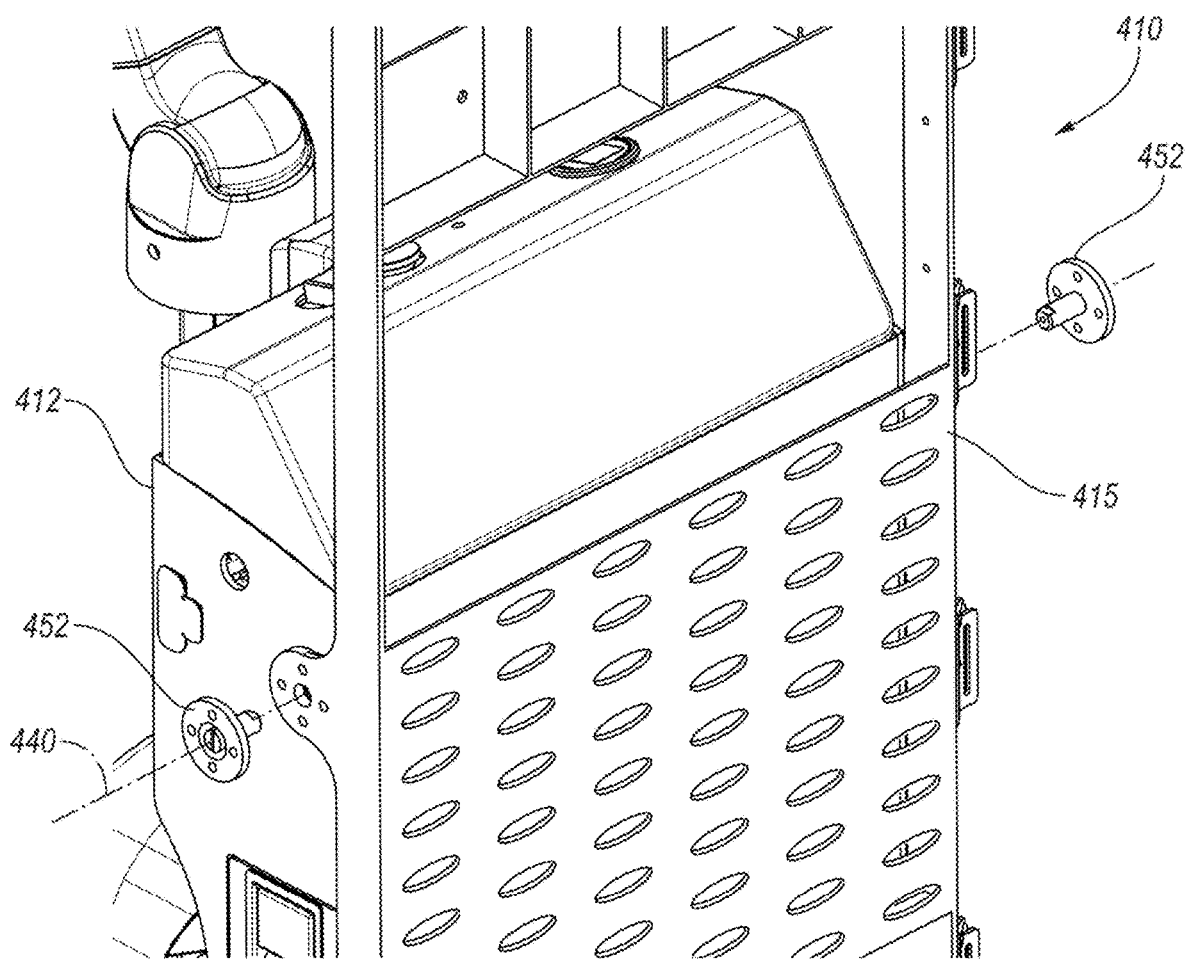
FIG. 28 is a partially exploded front view of the base of the pallet lift.

FIG. 28 is a partially exploded front view of the base 412 of the pallet lift 410. Fasteners 452 provide a pivoting hinge connection along axis 440 between the backrest 415 and the base 412.

Figure 29:
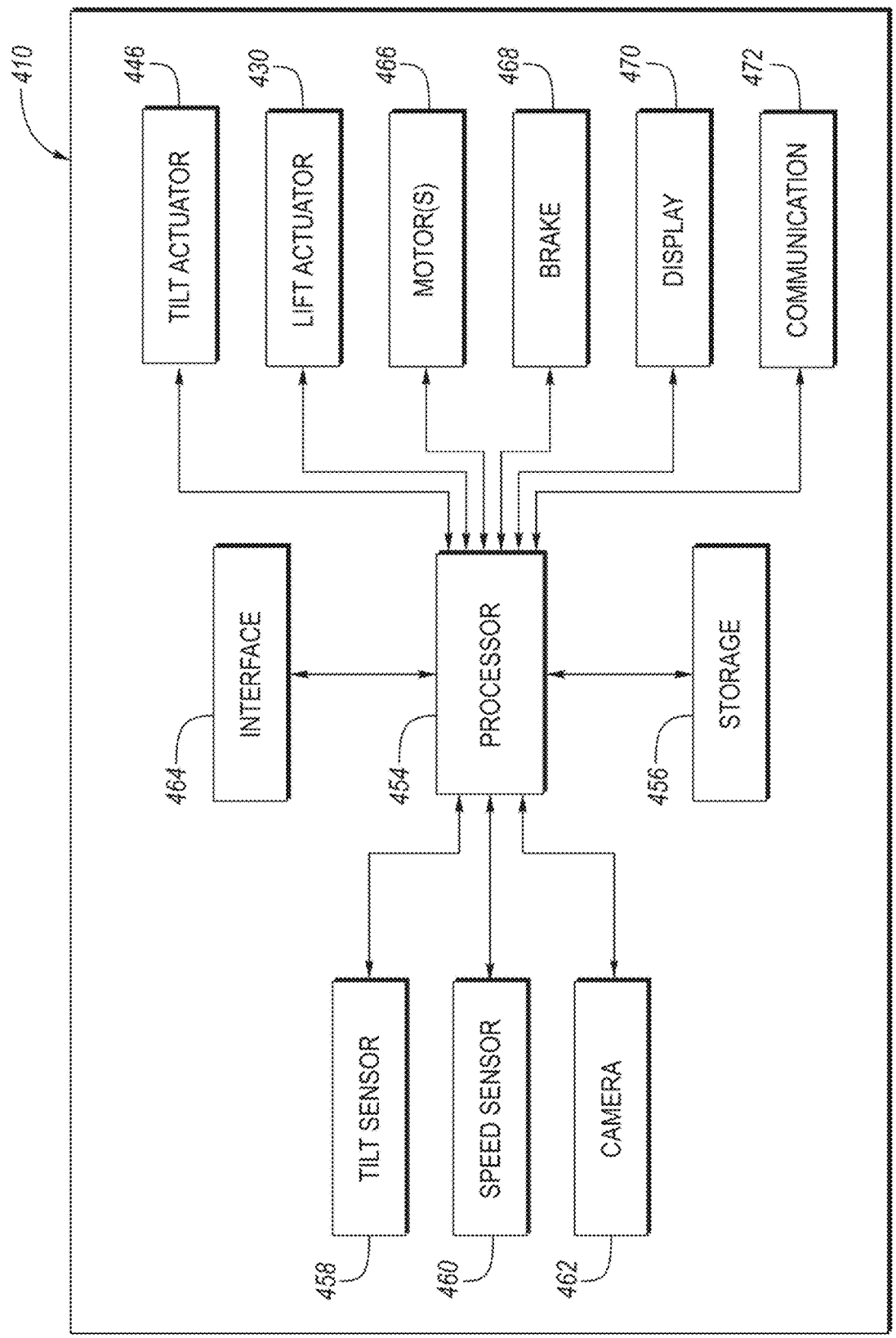
FIG. 29 shows one possible schematic of the pallet lift.

FIG. 29 shows one possible schematic of the pallet lift 410. A processor 454 may be mounted in the base 412. The processor 454 is connected to electronic storage 456 storing computer instructions which when executed by the processor 454 causes the processor 454 to perform the functions described herein. Of course, the processor 454 could include a plurality of processors including processors of different types at different locations.

The processor 454 receives inputs from a tilt sensor 458, which may be a three-axis or two-axis accelerometer, or other sensor that generates a signal indicating its orientation relative to gravity. The tilt sensor 458 is mounted in a fixed orientation relative to the platform 414. For example, the tilt sensor 458 may be mounted to the backrest 415 or to the platform 414. At least one speed sensor 460 is mounted to one of the load wheels 420 and/or the rear wheel 418. A camera 462 is mounted to one of the tines 444 (or otherwise to the deck below the platform) or to the platform 414. The camera 462 provides continuous live video from the camera 462 to the processor 454 and then to the display 470 (or directly to the display 470). The processor 454 receives a signal from a user interface 464, which may be a touchscreen (e.g. display 470), microphone, button, switch, keyboard, trackpad, mouse, etc.

The processor 454 sends control signals to the tilt actuator 446 and the lift actuator 430 in the manner described herein. The processor 454 also sends control signals to motors 466 coupled to or within one or both of the load wheels 420 or the rear wheel 418. The processor 454 also controls a brake 468 (if provided) on one or more of the load wheels 420 and rear wheel 418.

The processor 454 is configured to send live video from the camera 462 to a display 470 mounted to the backrest 415 or to the base 412. The processor 454 may enhance the live video with guidelines to help the user steer the pallet lift 410. The processor 454 is connected to a wireless communication circuit 472 such as cell data, wifi, Bluetooth, etc.

FIG. 30 shows the pallet lift 410 carrying a pallet 50 on the platform 414. The pallet 50 is loaded with a stack of products 52. A ramp R extends from a floor of truck T to ground G. The ramp R may be inclined more than ten degrees. As the pallet lift 410 moves from the relatively level floor T of a truck onto the inclined ramp R, the tilt sensor 458 senses the change in orientation of the backrest 415 and platform 414. The processor 454 receives this signal from the tilt sensor 458 and commands the tilt actuator 446 to pivot the platform 414 and backrest 415 rearward until the tilt sensor 458 detects that the platform 414 is returned to generally level relative to gravity, i.e. perpendicular to gravity (or tilted rearward slightly, e.g. two degrees). As the load wheels 420 begin down the ramp R, the pallet lift 410 will gradually tilt and the pallet lift 410 will gradually extend the tilt actuator 446 pivoting the platform 414 more and more until the rear wheel 418 is also on the ramp R, which is when the pallet lift 410 will be tilted the most. Then, when the load wheels 420 reach the relatively level ground G, the pallet lift 410 will gradually return to level and the tilt actuator 446 will be gradually retracted, pivoting the platform 414 downward to maintain the platform 414 perpendicular to gravity (or tilted slightly rearward). When the rear wheel 418 reaches the ground G, the platform 414 will be returned to an orientation generally parallel to the tines 444, again, substantially orthogonal to gravity.

As is apparent from FIG. 30, while the pallet lift 410 is traveling down the ramp R, it would be difficult for the operator to see past the products 52 on the pallet 50. The optional camera 462 mounted to one of the tines 444 (or otherwise at the front of the deck) provides a live video feed of the area in front of the pallet lift 410 to the display 470 mounted to the base 412. FIG. 30 shows an alternate location for the camera 462a, mounted to the front of the platform 414 (or just under the front of the platform 414). The camera 462 or camera 462a could also be used on level surfaces when the platform 414 are not tilted relative to the base 412.

The display 470 could also have overlaid navigation lines that show the operator the expected path of the pallet lift 410 based upon a current orientation of the tiller arm 416 (or other steering mechanism). The operator would use the navigation lines to steer straight down the ramp or to estimate whether or not they will make a turn, similar to the backup cameras on modern vehicles.

Active Speed Control

During use of the pallet lift 410, a fast speed (like fast walking speed) would be needed for use on flat ground G and a very slow speed (around 1 mph) would be needed to descend a ramp R safely. The processor 454 controls the speed of the pallet lift 410 by controlling the motor 466 (and the brake 468, if provided, FIG. 29). In FIG. 30, the motor 466 is shown as a standard electric pallet jack drive motor 466 connected to the rear wheel 418. Hub motors within the load wheels 420 could be used as an alternative.

In order to improve ease of use and operator safety while descending a ramp, a speed limiter could be automatically implemented by the processor 454 once the pallet lift 410 detects that it is descending a ramp, such as by detecting a tilt in excess of a threshold by the tilt sensor 458.

Optionally, the pallet lift 410 could also have a button or switch in the user interface 464 (shown in FIG. 30 as a UI on display 470, which may be a touch screen) which turns on "ramp mode" that activates the speed control and adjusts the previously mentioned Active Stability Control and Active Traction Control settings for optimal ramp settings. Pressing the "ramp mode" button may also enable the processor 454 to activate the tilt actuator 446 based upon input from the tile sensor 458, such that when the tilt actuator 446 detects that it being tilted relative to gravity (e.g. as the pallet lift 410 goes down the ramp), the processor 454 receives this signal from the tilt actuator 446 and sends counteractive signals to the tilt actuator 446 to maintain the platform 414 perpendicular to gravity (or tilted slightly back). When the load wheels 420 hit the level ground after the ramp, the pallet lift 410 starts to return to level ground, which is detected by the tilt sensor 458, so the processor 454 sends signals to the tilt actuator 446 to move the platform 414 back toward the tines 444 to maintain the upper surface of the platform 414 perpendicular to gravity (or tilted slightly back).

Active Stability Control

Since the stability of the pallet lift 410 is key to preventing a tip-over of the system, one embodiment could use the tilt sensor 458 to detect the side to side angle (roll) of the pallet lift 410 as well as the pitch, and if the angle of the lift is past a pre-determined safe angle, the electronic controller could take action to prevent tipping, such as slowing or stopping the pallet lift 410 by reducing power to the motors 466 or applying the brake 468, lowering the load height by releasing the lift actuator 430, increasing or decreasing the tilt angle by appropriately controlling the tilt actuator 446 or a combination thereof.

Active Traction Control

The pallet lift 410 may be driven on various surfaces in a range of conditions (hot, cold, rain, snow, aluminum ramps, steel ramps, pavement, concrete, dirt, wood etc.) and in order to improve traction, the processor 454 could detect drive wheel (in this case, the rear wheel 418) slip and take action to reduce the wheel slip and help regain control. This would be specifically helpful while on a ramp, since losing traction while descending the ramp would cause loss of steering and loss of speed control.

One method to detect drive wheel slip is by comparing the pallet lift 410 acceleration, as detected by an accelerometer (such as tilt sensor 458), to the drive wheel speed, as provided by the speed sensor 460 (which may be a drive wheel encoder) and comparing these inputs to a function which characterizes normal acceleration vs wheel speed. When a large enough delta between the actual acceleration vs expected acceleration exists, the electronic controller can take action to reduce wheel slip.

Active Load Control

The pallet lift 410 could sense the weight of the load and automatically adjust the previously mentioned Active Stability Control, Active Traction Control and Active Speed Control settings to suit the load. The load sensing could be done by measuring the line pressure of the hydraulic lifting mechanism of the tilt actuator 446 or by load cells placed under the load platform or by deriving it from the energy required to accelerate the load.

Equipment Guides

Since the ramps that the pallet lift 410 is used on are very narrow, it can be difficult to navigate without hitting the side guard rails of the ramp. To prevent damage to the pallet lift 410 or ramp, the pallet lift 410 could have side bumpers that contact the guard rails of the ramp before the rest of the pallet lift 410 does. By positioning the bumpers near the front and/or back of the pallet lift 410, steering the pallet lift 410 straight down the ramp would no longer be required.

In one embodiment the bumpers could "sliders," hard plastic or rubber material which slides along the side guard rail of the ramp.

In another embodiment the bumpers could be rolling wheels positioned to roll along the guard rails of the ramp when in contact. The rollers could be attached to the frame of the pallet lift 410 and used in a fixed fashion to keep the lift from driving too far to one side or the other. The rollers could also be attached to the steering mechanism so that when in contact with the side guard rails, the steering is pushed to steer away from the side guard rail.

A different embodiment could use a combination of rollers and sliders that allows the pallet lift 410 to drive down the ramp while in contact with the side guard rail the whole time without any risk of catching or damaging the lift or ramp.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method claim steps are for ease of reference in dependent claims only and do not signify a required sequence of steps unless other explicitly recited in the claims.

What is claimed is:

1. A delivery device comprising:
    a base;
    a deck extending forward of the base;
    load wheels supporting the deck;
    a platform above the deck and pivotable relative to the base, wherein the platform has an upper support surface for supporting objects thereon; and
    an actuator secured to the base and to a forward end of the platform, the actuator configured to pivot the platform relative to the base and relative to the deck.

2. The delivery device of claim 1 further including a backrest extending upward from the platform.

3. The delivery device of claim 1 wherein the platform is pivotable about an axis parallel to axes of the load wheels.

4. The delivery device of claim 1 further including a rear wheel mounted below the base and pivotable relative to the base by a tiller arm.

5. The delivery device of claim 4 wherein the load wheels and the rear wheel are motorized to drive the delivery device.

6. The delivery device of claim 5 wherein the load wheels each have a hub motor therein.

7. The delivery device of claim 1 further including:
    a gravity sensor configured to detect its orientation relative to gravity; and
    a controller configured to automatically activate the actuator to cause the platform to pivot relative to the base based upon a gravity signal from the gravity sensor.

8. The delivery device of claim 7 further including a speed sensor configured to detect a speed of the delivery device and to generate a speed signal indicative of the speed of the delivery device, wherein the delivery device further includes at least one motor for powering at least one of the load wheels, wherein the controller is configured control a speed of the at least one motor based upon the speed signal from the speed sensor.

9. The delivery device of claim 8 wherein the controller is configured to control the speed of the at least one motor based upon the gravity signal.

10. The delivery device of claim 1 wherein the load wheels are secured to arms pivotably secured to the deck.

11. The delivery device of claim 1 further including:
    at least one camera mounted to the deck; and
    a display mounted to the base, the display configured to display a live view from the at least one camera.

12. The delivery device of claim 1 further including a rear wheel mounted below the base, wherein the load wheels and the rear wheel are motorized to drive the delivery device.

13. The delivery device of claim 12 wherein the load wheels each have a hub motor therein.

14. The delivery device of claim 1 further in combination with a pallet supported on the platform.

15. A method for stabilizing a platform including:
    a) supporting at least one object on a platform, wherein the platform is pivotably supported on a deck;
    b) moving the deck on wheels from a floor of a truck onto a ramp extending from the truck to ground, wherein the wheels are below the deck and below the platform;
    c) detecting an orientation during step b); and
    d) pivoting the platform relative to the ramp and relative to the deck based upon the orientation detected in step c) to maintain the platform substantially perpendicular to gravity.

16. The method of claim 15 wherein the platform is connected to a backrest and wherein the platform and the backrest are pivoted in step d).

17. The method of claim 16 further including: e) moving the at least one object on the platform across the ramp while the at least one object and the platform are pivoted relative to the wheels.

18. The method of claim 17 wherein the platform is substantially perpendicular to gravity during step e).

19. The method of claim 18 wherein the ramp is inclined more than ten degrees.

20. The method of claim 15 further including controlling with at least one processor a speed at which the platform travels on the ramp based upon the orientation detected in step c).

21. A delivery device comprising:
    a base;
    a handle extending from the base for steering the delivery device;
    a rear wheel supporting the base;
    a platform extending forward from a lower end the base, the platform having an upper surface for supporting objects thereon;
    a plurality of load wheels supporting the platform;
    a camera mounted proximate a front of the delivery device; and
    a display mounted proximate an upper end of the base and oriented generally rearward of the delivery device, the display configured to provide a live video feed from the camera.

22. The delivery device of claim 21 further in combination with a pallet supported on the platform.

23. The delivery device of claim 22 wherein the camera is mounted to a forward end of the platform.

24. The delivery device of claim 21 further include a deck extending forward from a lower end of the base below the platform, wherein the platform is pivotably mounted relative to the base and relative to the deck, wherein the camera is mounted to a forward end of the deck.

25. The delivery device of claim 21 further including a backrest extending upward from the platform, wherein the backrest is pivotably secured to the base.

26. The delivery device of claim 21 wherein the plurality of load wheels each have a hub motor therein.

27. The delivery device of claim 26 wherein the rear wheel is motorized to drive the delivery device.

28. A pallet lift comprising:
a base;
at least one rear wheel supporting the base;
a platform extending forward of the base;
a pair of load wheels each secured to an arm pivotable relative to the platform, wherein the arm is configured to move the respective load wheel toward and away from the platform thereby lowering and raising the platform relative to a floor;
a gravity sensor configured to generate an orientation signal indicating an orientation relative to gravity;
a speed sensor configured to generate a speed signal indicative of the speed of the pallet lift;
at least one motor for powering at least one of the load wheels; and
a controller configured to control a speed of the at least one motor based upon the speed signal from the speed sensor and based upon the orientation signal from the gravity sensor.

29. The pallet lift of claim 28 further including a deck extending forward from the base below the platform, wherein the platform is pivotable relative to the base and relative to the deck, wherein the arms are pivotably secured to the deck.

30. The pallet lift of claim 28 wherein the at least one rear wheel is mounted below the base and is pivotable about a vertical axis relative to the base by a tiller arm.

\* \* \* \* \*